US011273713B2

(12) United States Patent
Yao et al.

(10) Patent No.: US 11,273,713 B2
(45) Date of Patent: Mar. 15, 2022

(54) REGENERATIVE BRAKING/ANTI-LOCK BRAKING CONTROL SYSTEM

(71) Applicant: FORD GLOBAL TECHNOLOGIES, LLC, Dearborn, MI (US)

(72) Inventors: Yixin Yao, Ann Arbor, MI (US); Yanan Zhao, Ann Arbor, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 16/576,274

(22) Filed: Sep. 19, 2019

(65) Prior Publication Data

US 2021/0086623 A1   Mar. 25, 2021

(51) Int. Cl.
| | |
|---|---|
| *B60L 7/26* | (2006.01) |
| *B62D 63/04* | (2006.01) |
| *B60L 7/18* | (2006.01) |
| *B60T 8/176* | (2006.01) |
| *B60K 6/20* | (2007.10) |

(52) U.S. Cl.
CPC ............. *B60L 7/26* (2013.01); *B60L 7/18* (2013.01); *B60T 8/176* (2013.01); *B62D 63/04* (2013.01);
(Continued)

(58) Field of Classification Search
CPC ... B60L 7/18; B60L 7/26; B60T 8/176; B60T 2270/10; B60T 2270/602; B60T 2270/604; B62D 63/04; B60K 6/20
See application file for complete search history.

(56) References Cited

U.S. PATENT DOCUMENTS

| | | |
|---|---|---|
| 5,476,310 A | 12/1995 | Ohtsu et al. |
| 5,615,933 A | 4/1997 | Kidston et al. |

(Continued)

FOREIGN PATENT DOCUMENTS

JP   14079099 A   5/2014

OTHER PUBLICATIONS

Oleksowicz, Selim, et al. "Regenerative braking control for high level deceleration on low mu surface." SAE International Journal of Alternative Powertrains 4.1 (2015): 209-224.
(Continued)

*Primary Examiner* — Bryan A Evans
(74) *Attorney, Agent, or Firm* — David B Kelley; Brooks Kushman P.C.

(57) ABSTRACT

A vehicle includes an axle, electric machine, friction, brakes, and a controller. The axle has an input shaft to an open differential and output shaft extending out of the open differential. The electric machine is secured to the input shaft and wheels are secured to the output shafts. The controller is programmed to, in response to an anti-locking braking event, generate a signal indicative of a total torque demand to brake the vehicle based on a difference between a desired and an actual wheel slip ratio, adjust a regenerative braking torque of the electric machine based on signal and a regenerative braking weighting coefficient to maintain or drive actual wheel slip toward the desired wheel slip, and adjust a friction braking torque of the friction brakes based on the signal and a friction braking weighting coefficient to drive actual wheel slip at or toward the desired wheel slip.

20 Claims, 22 Drawing Sheets

(52) U.S. Cl.
CPC ............. *B60K 6/20* (2013.01); *B60T 2270/10* (2013.01); *B60T 2270/602* (2013.01); *B60T 2270/604* (2013.01)

(56) References Cited

U.S. PATENT DOCUMENTS

| | | | |
|---|---|---|---|
| 6,231,134 | B1 | 5/2001 | Fukasawa et al. |
| 6,709,075 | B1* | 3/2004 | Crombez ............ B60T 8/17636 303/152 |
| 7,152,934 | B2 | 12/2006 | Fuhrer et al. |
| 7,794,026 | B2 | 9/2010 | Nakayama et al. |
| 9,193,339 | B2 | 11/2015 | Yao et al. |
| 9,586,488 | B2 | 3/2017 | Nakaoka et al. |
| 10,399,440 | B2 | 9/2019 | Zhao et al. |
| 10,723,229 | B1 | 7/2020 | Yao et al. |
| 2006/0138859 | A1 | 6/2006 | Nakayama et al. |
| 2007/0046099 | A1* | 3/2007 | Matsuura ............ B60W 10/184 303/152 |
| 2012/0138375 | A1* | 6/2012 | Hughes ..................... B60L 7/26 180/65.1 |
| 2015/0149056 | A1 | 5/2015 | Yao et al. |
| 2015/0274159 | A1* | 10/2015 | Lu ........................ B60W 30/02 701/82 |
| 2016/0096434 | A1 | 4/2016 | Nakaoka et al. |
| 2016/0264111 | A1 | 9/2016 | Doi et al. |
| 2018/0093571 | A1* | 4/2018 | Hall .......................... B60T 1/10 |
| 2018/0154777 | A1* | 6/2018 | Hall .......................... B60L 7/26 |
| 2018/0264949 | A1 | 9/2018 | Kaneko et al. |
| 2018/0354495 | A1* | 12/2018 | Kumazaki ............... B60K 6/365 |
| 2018/0361856 | A1 | 12/2018 | Zhao et al. |
| 2019/0039450 | A1* | 2/2019 | Baba ............... B60W 30/18136 |
| 2021/0053448 | A1 | 2/2021 | Beck et al. |
| 2021/0086623 | A1 | 3/2021 | Yao et al. |
| 2021/0221343 | A1 | 7/2021 | Yao et al. |
| 2021/0237614 | A1 | 8/2021 | Yao et al. |

OTHER PUBLICATIONS

Oleksowicz, Selim, Keith Burnham, and Andrzej Gajek. "On the legal, safety and control aspects of regenerative braking in hybrid/electric vehicles." Czasopismo Techniczne. Mechanika 109.3-M (2012): 139-155.

Ivanov, Valentin, et al. "Design and testing of ABS for electric vehicles with individually controlled on-board motor drives." SAE International Journal of Passenger Cars-Mechanical Systems 7.2014-01-9128 (2014): 902-913.

R. Kubaisi, "Adaptive Regenerative Braking in Electric Vehicles", PhD. Thesis, Karlsruher Institut für Technologie (KIT), Dec. 2018.

49 CFR Part 571 Part 571, 49 CFR 571 135—Standard No. 135; Light vehicle brake systems Federal Motor Vehicle Safety Standards.

European Directive 71/320/EEC. Council Directive 2006/96/EC of Nov. 20, 2006, L 363 81.

ECE 13-H. Passenger cars with regards to braking. United Nations Rev.2/Add.12H/Amend. 4 of 6, Aug. 2007.

Oleksowicz, Selim, et al. "Legal, Safety and Practical Regenerative Braking Control Challenges" Measurement and Control 46.9 (2013): 283-288.

Khaleghian, Seyedmeysam, Anahita Emami, and Saied Taheri. "A technical survey on tire-road friction estimation." Friction 5.2 (2017): 123-146.

Oleksowicz, S. A., et al. "Investigation of regenerative and anti-lock braking interaction." International Journal of Automotive Technology 14.4 (2013): 641-650.

Oleksowicz, Selim A., et al. "Regenerative braking strategies, vehicle safety and stability control systems: critical use-case proposals." Vehicle System Dynamics 51.5 (2013): 684-699.

Fuentes, L.V., Regenerative Braking Systems, Universidad Pontificia Comillas ICAI-ICADE, May 2014.

Reif K. (Ed.), "Brakes, Brake Control and Advanced Driver Assistance Systems", Springer Verlag, 2014, 14 pages.

Wen-Po Chiang, et al., "Integrated Slip-Based Torque Control of Antilock Braking System for In-Wheel Motor Electric Vehicle", IEE Journal of Industry Applications, vol. 3, No. 4, pp. 318-327, 2014, 10 pages.

Dzmitry Savitski et al., "The New Paradigm of Anti-Lock Braking System for Full Electric Vehicle Experimental Investigation and Benchmarking", Proceedings of the Institution of Mechanical Engineers Part D Journal of Automobile Engineering, Oct. 2015, 14 pages.

* cited by examiner

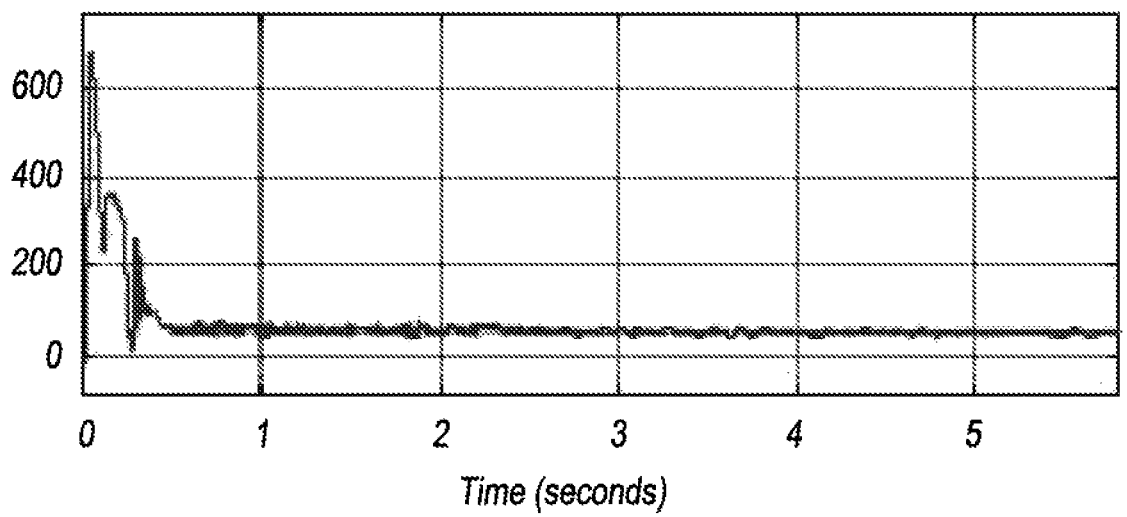
Fig-18-A
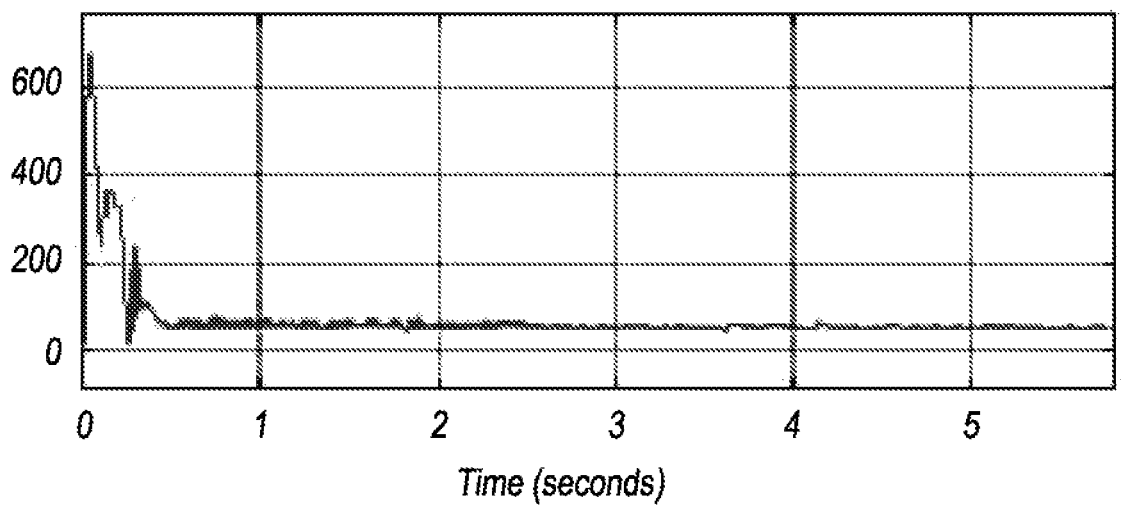
Fig-18-B

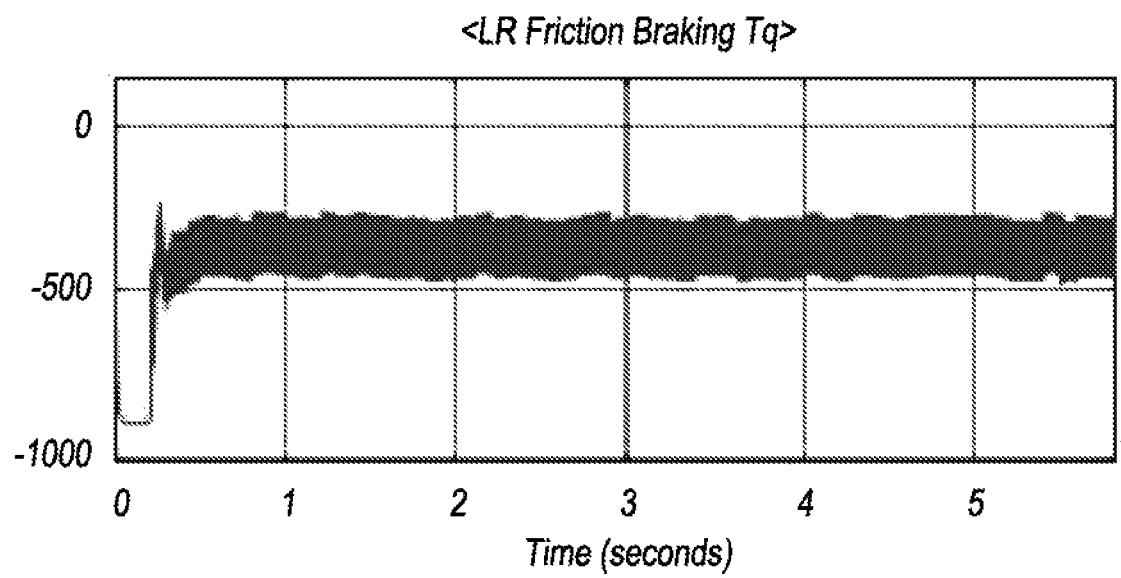
Fig-18-C
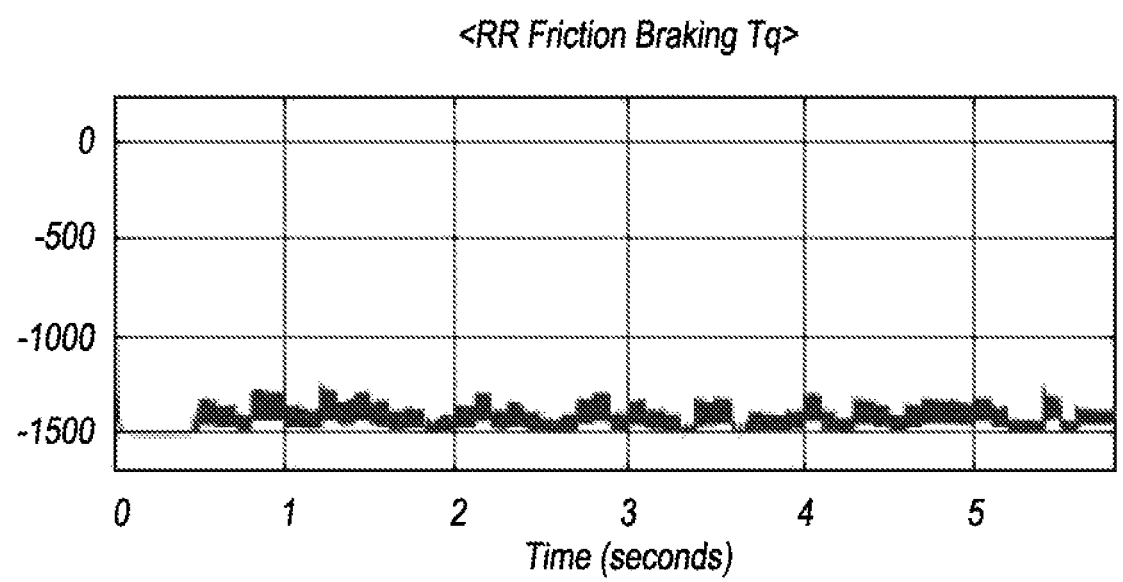
Fig-18-D

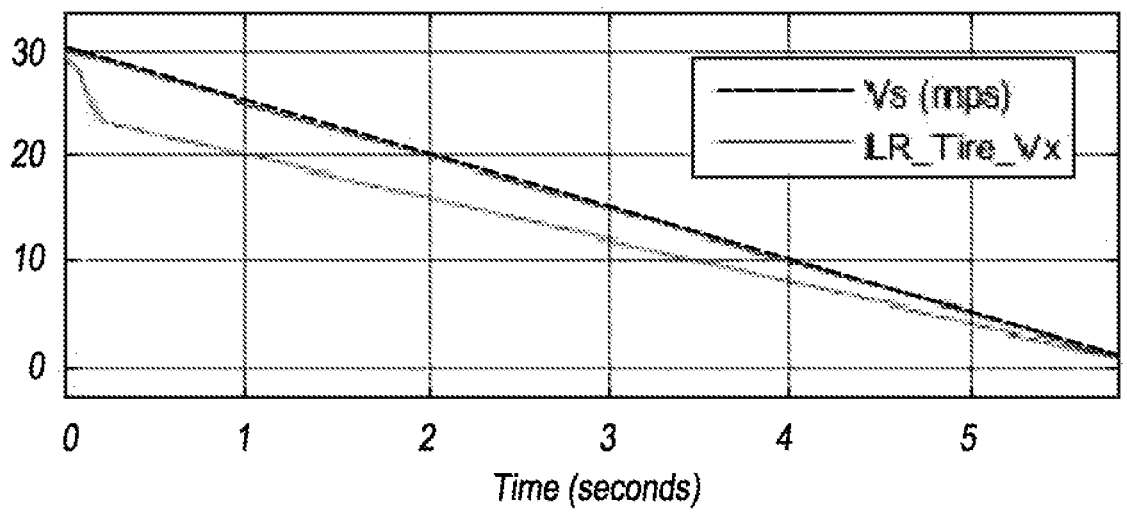
*Fig-18-E*
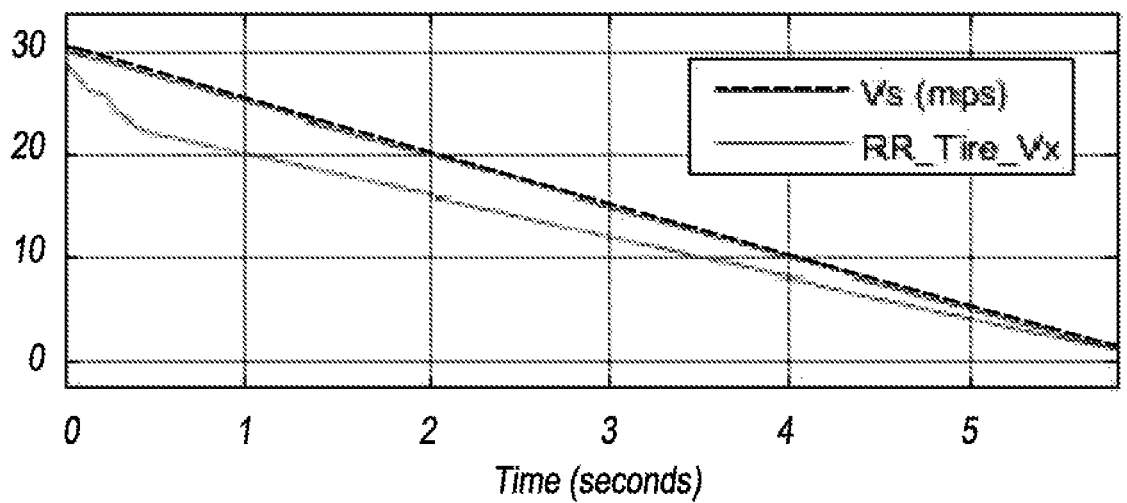
*Fig-18-F*

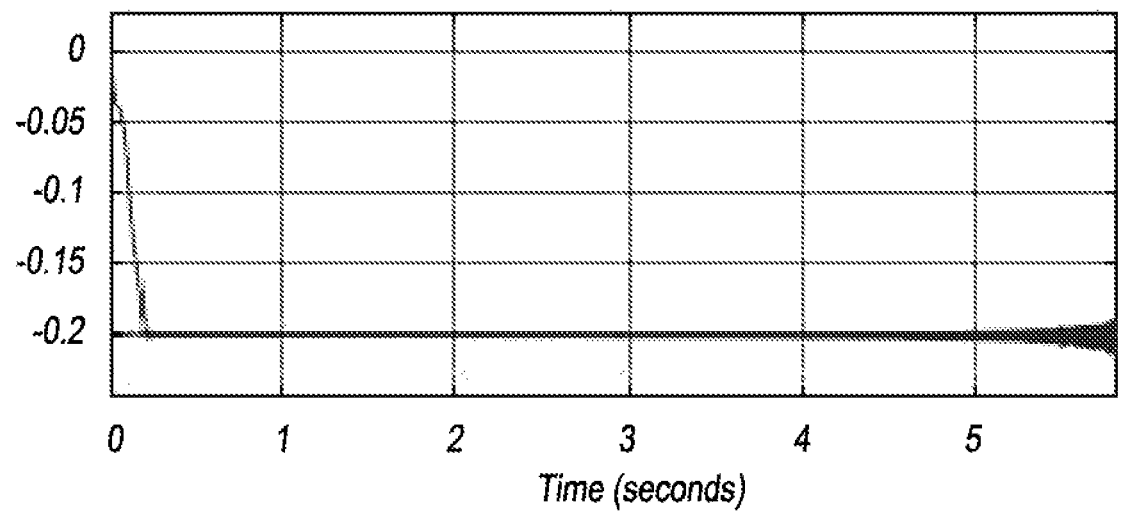
Fig-18-G
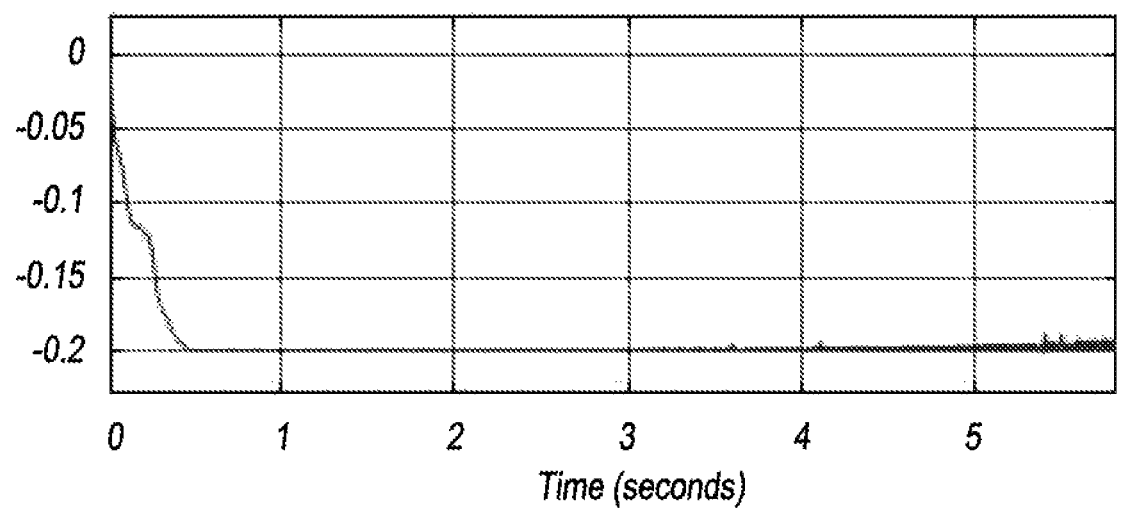
Fig-18-H

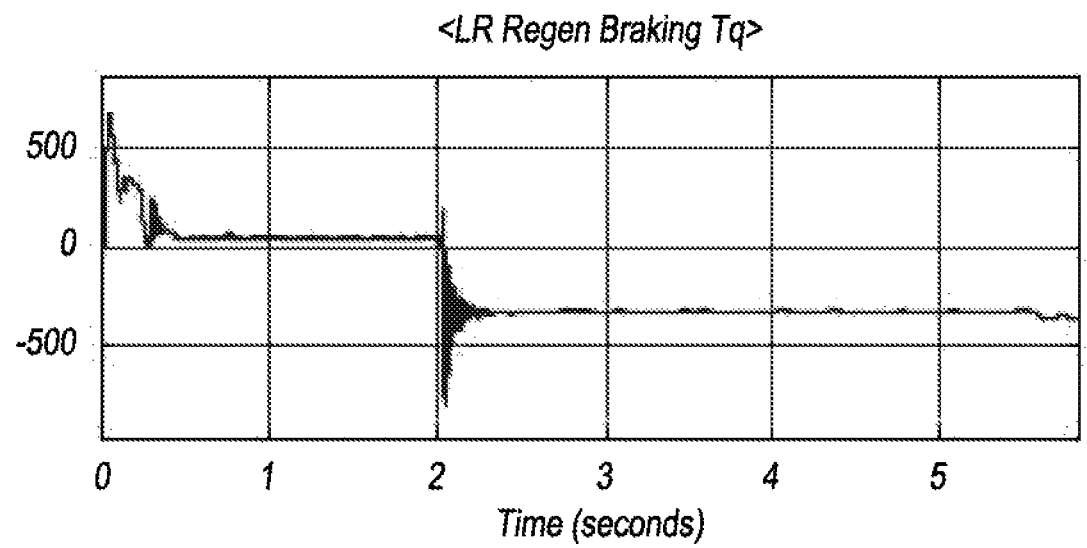
Fig-19-A
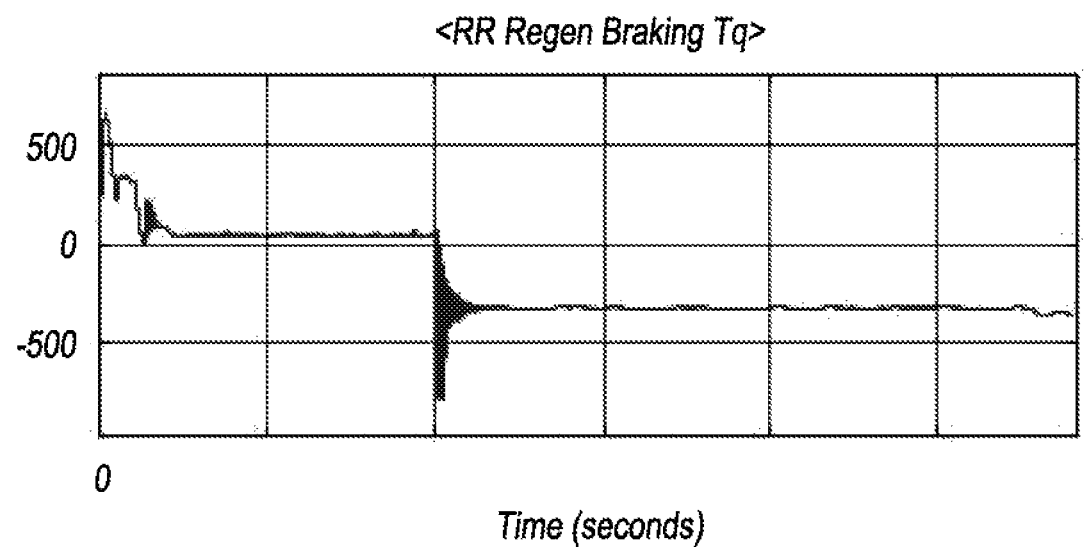
Fig-19-B

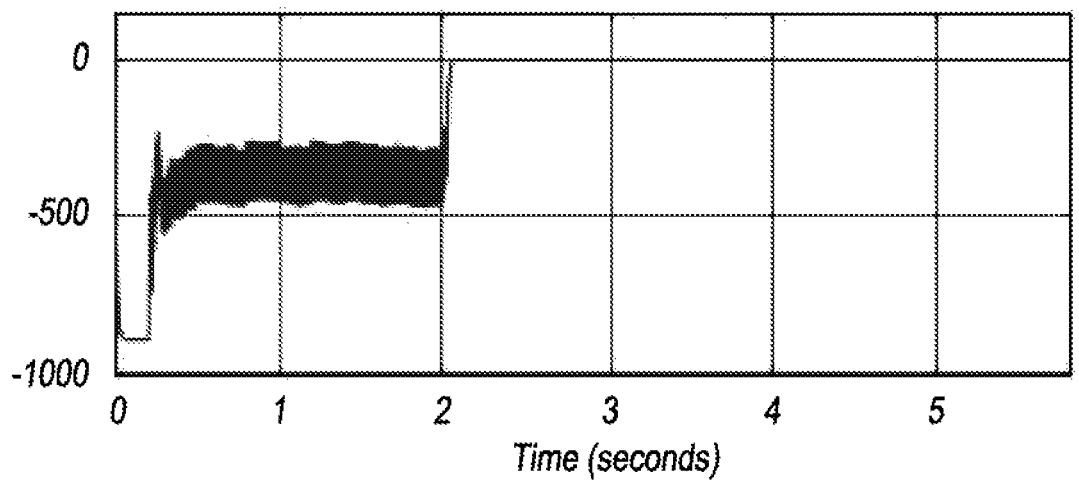
Fig-19-C
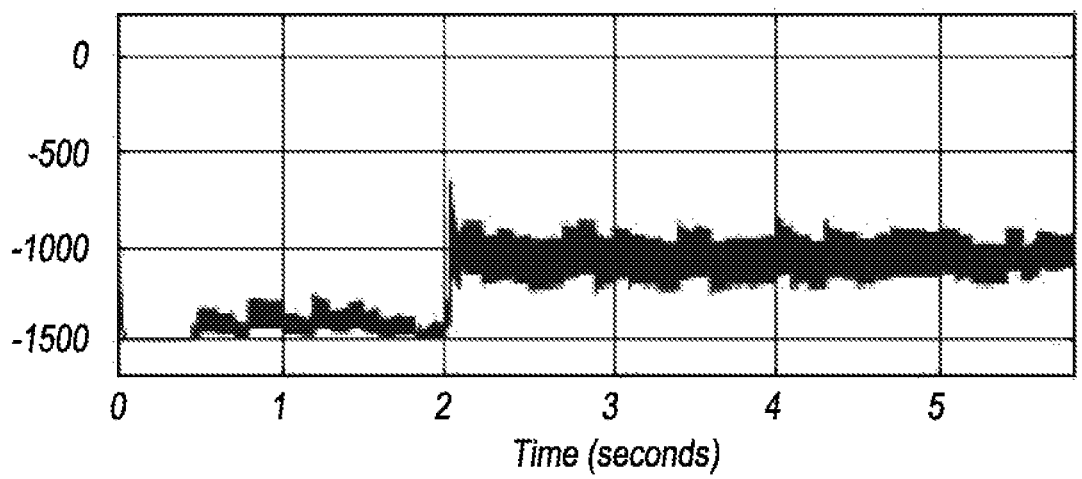
Fig-19-D

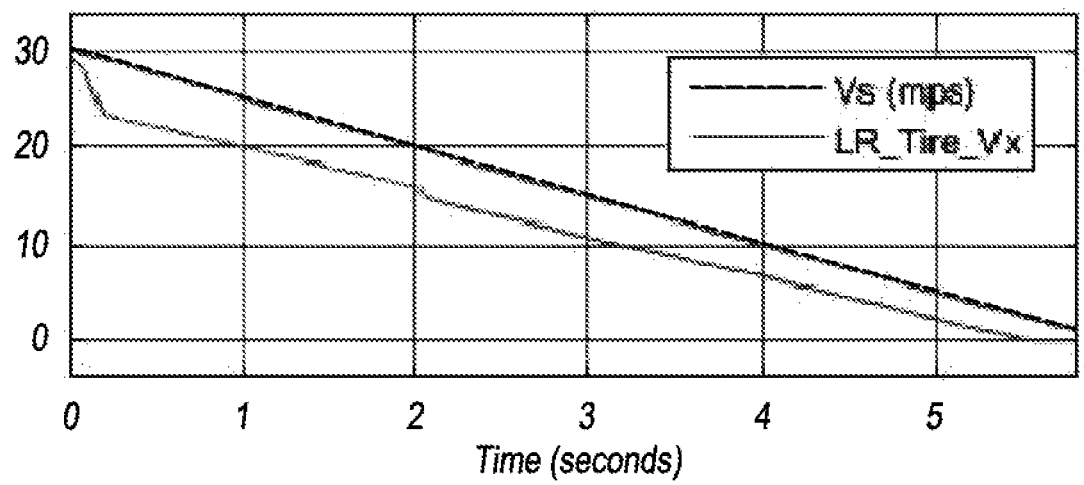
*Fig-19-E*
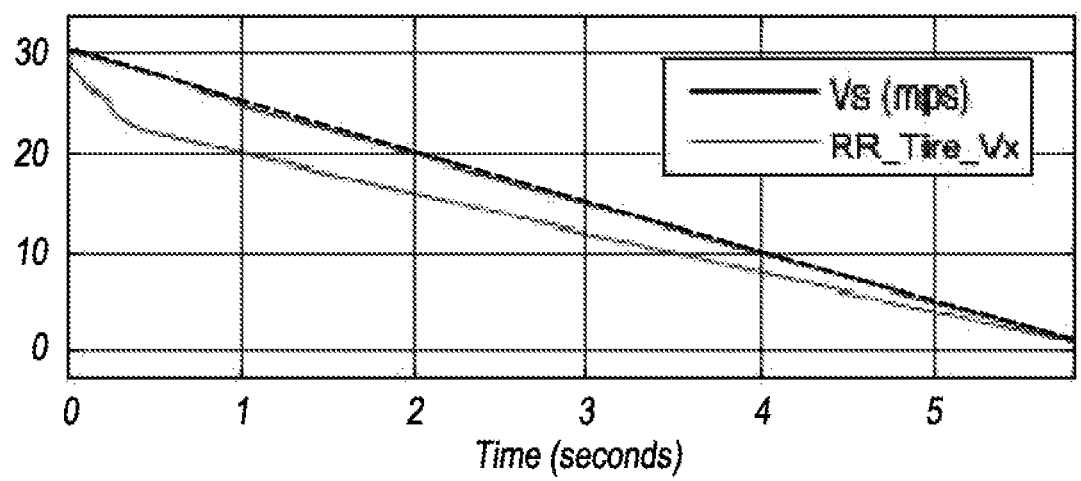
*Fig-19-F*

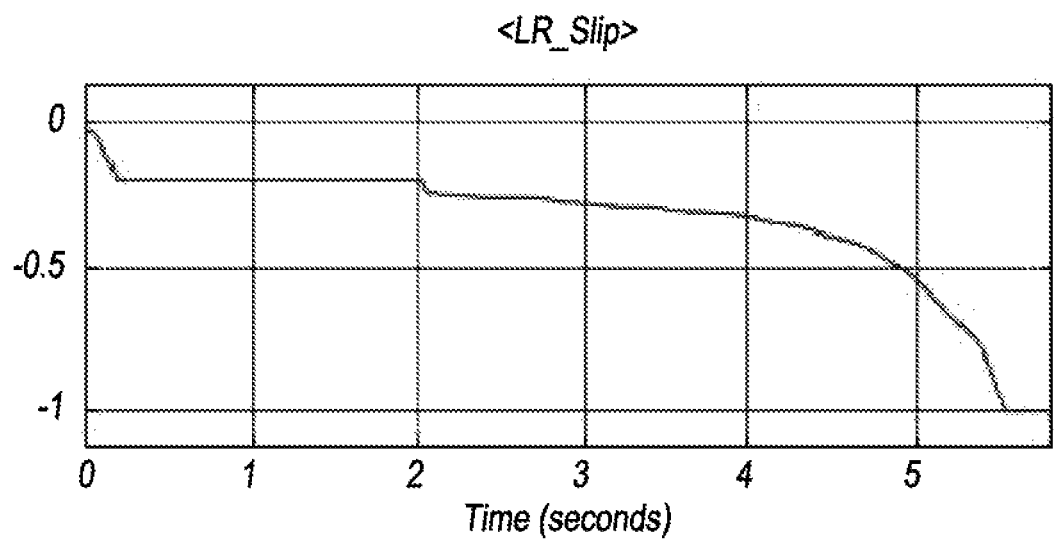
Fig-19-G
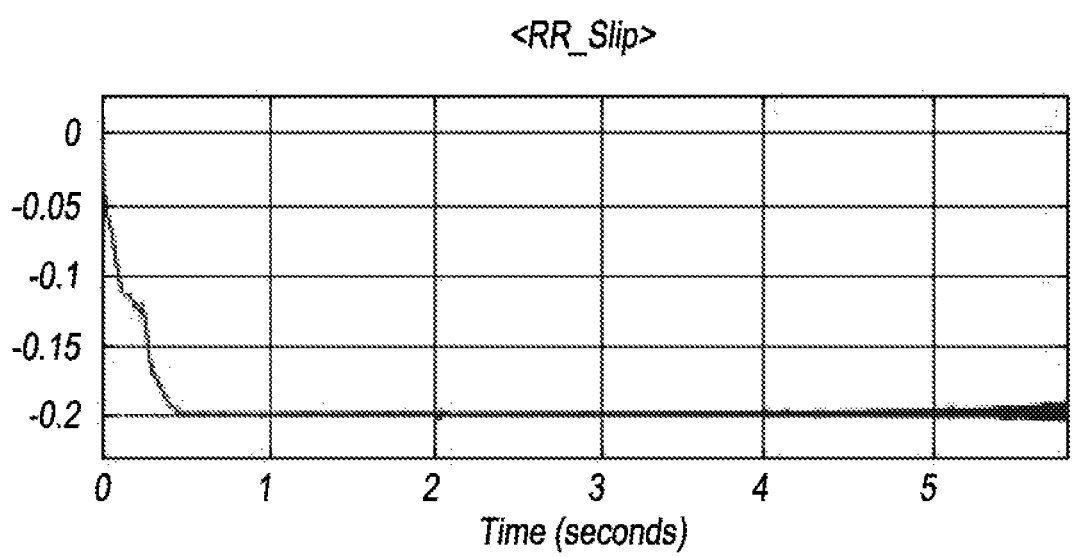
Fig-19-H

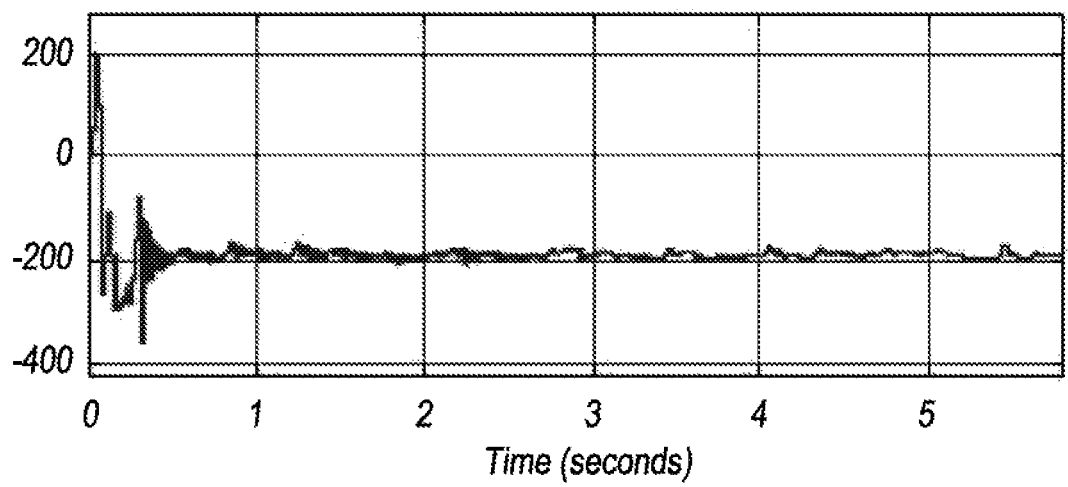
Fig-20-A
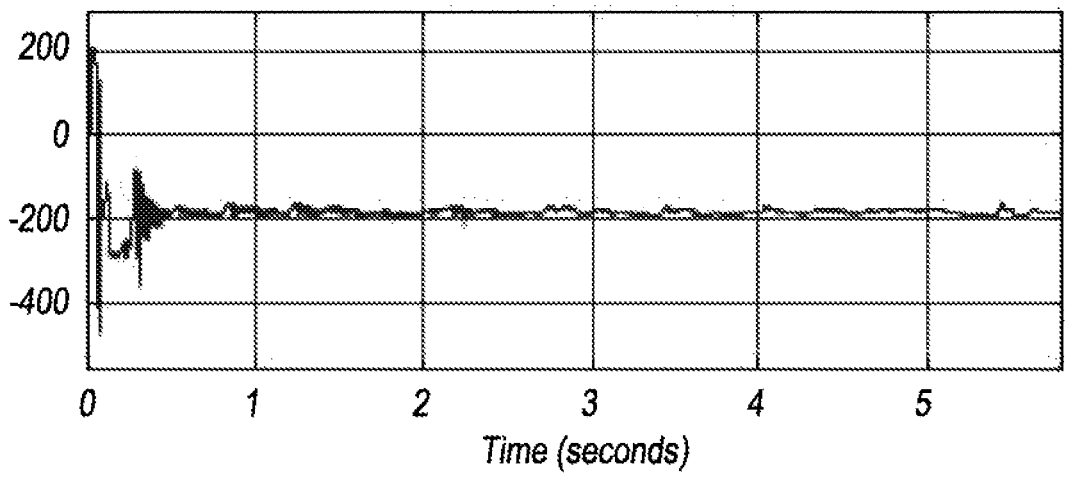
Fig-20-B

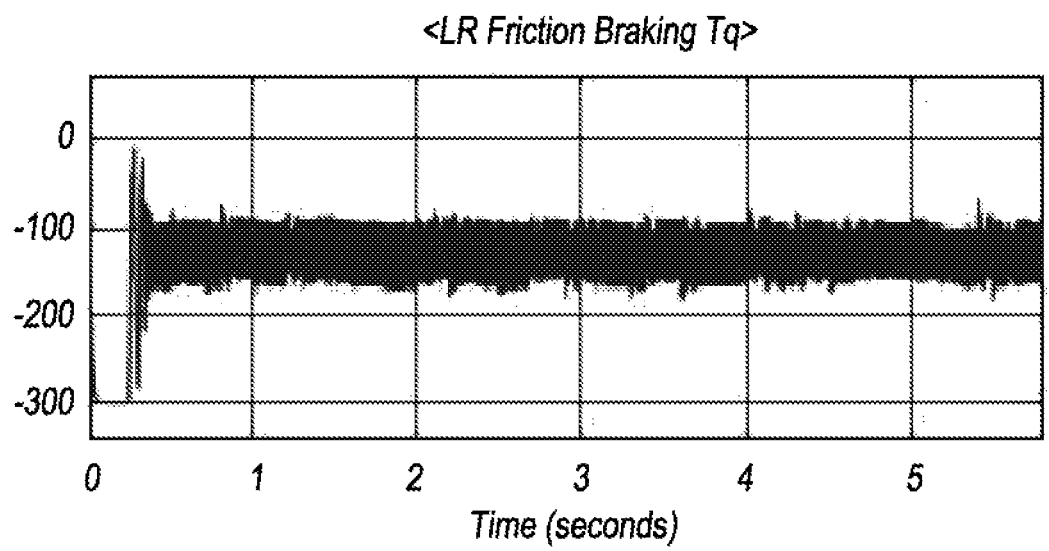
Fig-20-C
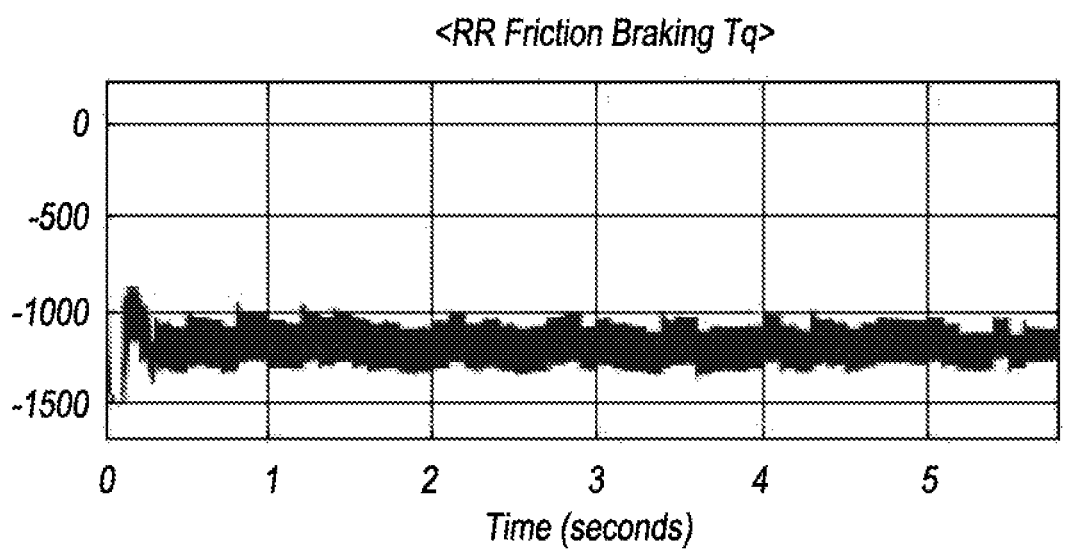
Fig-20-D

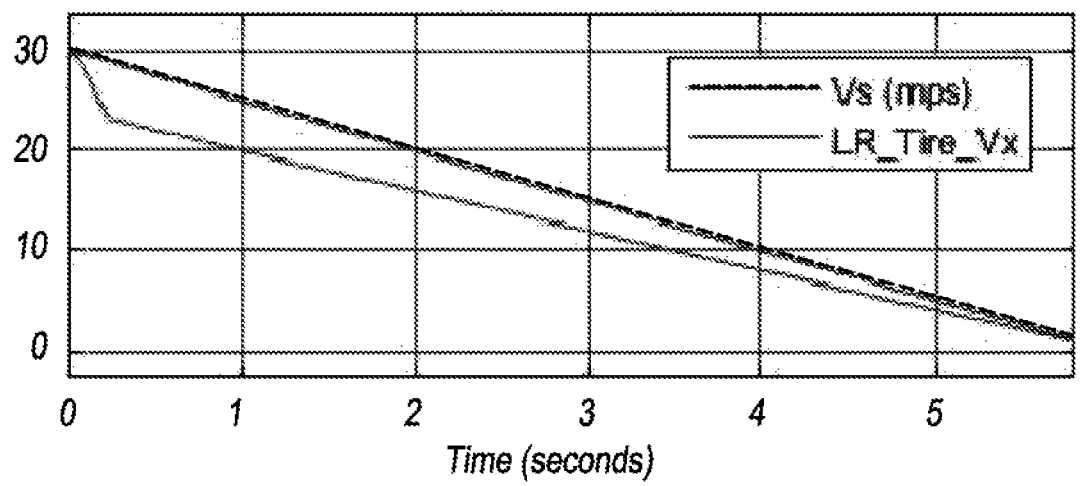
*Fig-20-E*
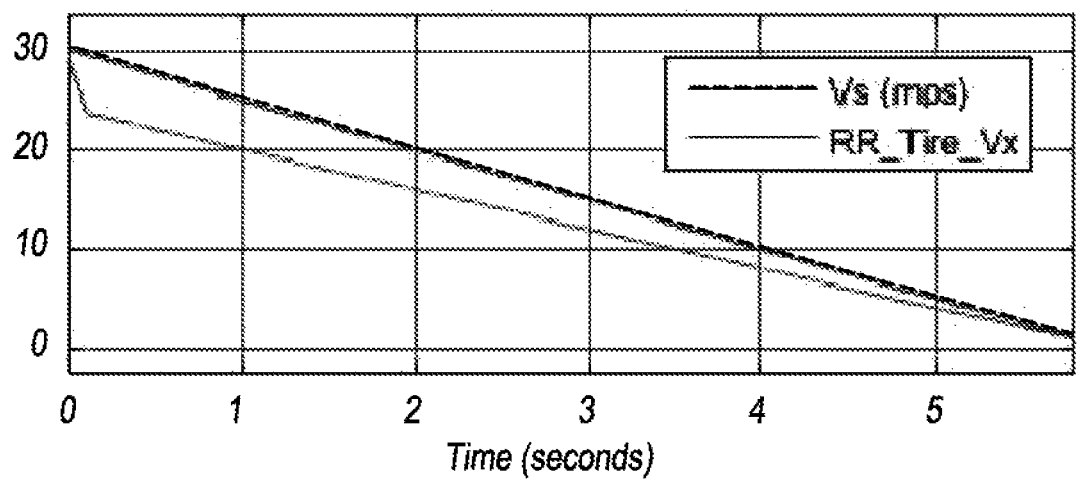
*Fig-20-F*

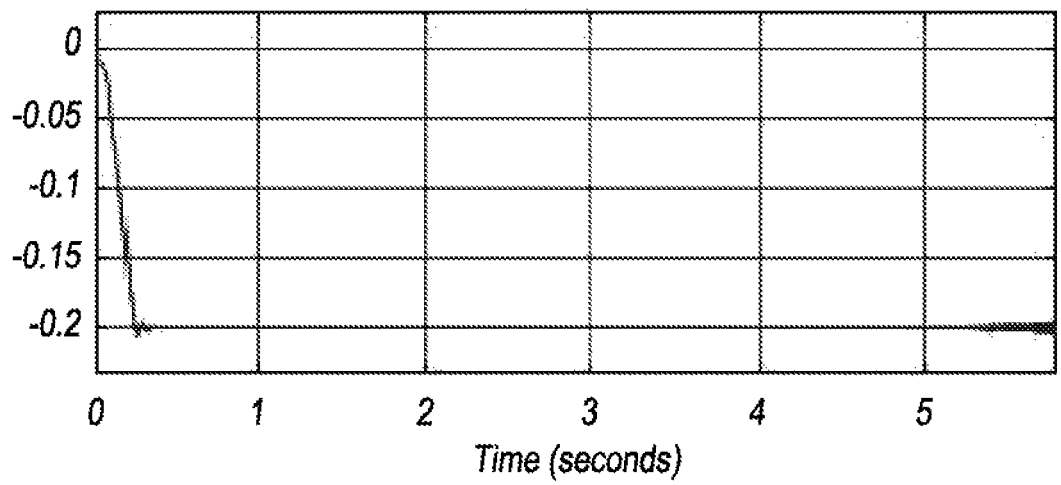
Fig-20-G
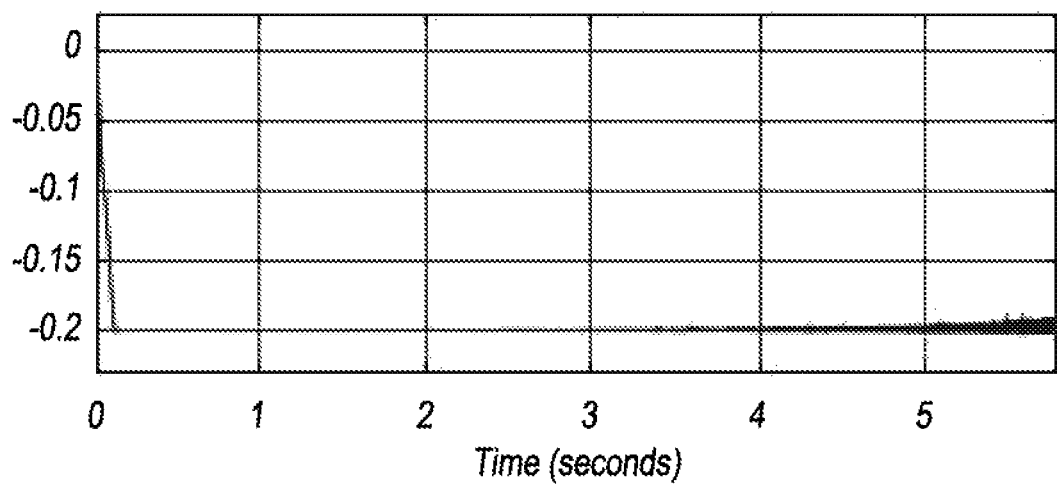
Fig-20-H

REGENERATIVE BRAKING/ANTI-LOCK BRAKING CONTROL SYSTEM

TECHNICAL FIELD

The present disclosure relates to hybrid electric vehicles and methods of controlling regenerative braking in hybrid/electric vehicles.

BACKGROUND

Regenerative braking is a feature of hybrid vehicles that improves fuel economy by recapturing kinetic energy when the vehicle slows down during a braking event. During regenerative braking, an electric machine may operate as a generator to convert the kinetic energy of the vehicle into electrical energy which is in turn used to charge a battery.

SUMMARY

A vehicle includes an electric machine, friction brakes, a drivetrain, and a controller. The electric machine is configured to recharge a battery during regenerative braking. The friction brakes are configured to apply torque to wheels of the vehicle to slow the vehicle. The drivetrain has a transmission. The controller is programmed to, in response to and during an anti-locking braking event, generate a signal indicative of a total torque demand to brake the vehicle based on a difference between a desired wheel slip ratio and an actual wheel slip ratio, adjust a regenerative braking torque of the electric machine based on a product of the signal and a regenerative braking weighting coefficient to maintain or drive actual wheel slip at or toward the desired wheel slip, and adjust a friction braking torque of the friction brakes based on a product of the signal and a friction braking weighting coefficient to maintain or drive actual wheel slip at or toward the desired wheel slip.

A vehicle includes an electric machine, a drivetrain, a first friction brake, a second brake, and a controller, the electric machine is configured to recharge a battery during regenerative braking. The drivetrain is configured to transfer torque between the electric machine and a first wheel and to transfer torque between the electric machine and a second wheel. The first friction brake is configured to apply torque to the first wheel to slow the vehicle. The second friction brake is configured to apply torque to the second wheel to slow the vehicle. The controller is programmed to, in response to and during an anti-locking braking event, generate a signal indicative of a total torque demand to brake the vehicle based on a difference between a desired wheel slip ratio and an actual wheel slip ratio, adjust a regenerative braking torque of the electric machine based on a product of the signal and a first weighting coefficient to maintain or drive actual wheel slip at or toward the desired wheel slip, adjust a first friction braking torque of the first friction brake based on a product of the signal and a second weighting coefficient to maintain or drive actual wheel slip at or toward the desired wheel slip, and adjust a second friction braking torque of the second friction brake based on a product of the signal and a third weighting coefficient to maintain or drive actual wheel slip at or toward the desired wheel slip.

A vehicle includes an axle, wheels, an electric machine, friction brakes, and a controller. The axle has an input shall to an open differential and output shall extending out of the open differential. Wheels are secured to each output shaft. The electric machine is secured to the input shaft and is configured to slow the vehicle during regenerative braking. The friction brakes are disposed about the wheels and are configured to slow the vehicle. The controller is programmed to, in response to and during an anti-locking braking event, generate a signal indicative of a total torque demand to brake the vehicle based on a difference between a desired wheel slip ratio and an actual wheel slip ratio, determine a regenerative braking weighting coefficient based on a ratio between a maximum braking torque of the electric machine and a braking torque threshold that corresponds with the wheels of the axle becoming locked, determine a friction braking weighting coefficient based on the regenerative braking weighting coefficient, adjust a regenerative braking torque of the electric machine based on a product of the signal and the first weighting coefficient during the anti-lock braking event to maintain or drive actual wheel slip at or toward the desired wheel slip, and adjust a friction braking torque of the friction brakes based on a product of the signal and a second weighting coefficient during the anti-lock weighting event to maintain or drive actual wheel slip at or toward the desired wheel slip.

BRIEF DESCRIPTION OF THE DRAWINGS

FIGS. 18A-18H are a series of graphs that illustrate braking control results during an anti-lock braking event that included no regenerative braking input;

FIG. 19A-19H are a series of graphs that illustrate braking control results during an anti-lock braking event that utilized an open loop based non-zero regenerative braking torque input; and FIG. 20A-20H are a series of graphs that illustrate braking control results during an anti-lock braking event that utilized a closed loop to control regenerative braking torque and friction brake torque based on a common signal.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for leaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
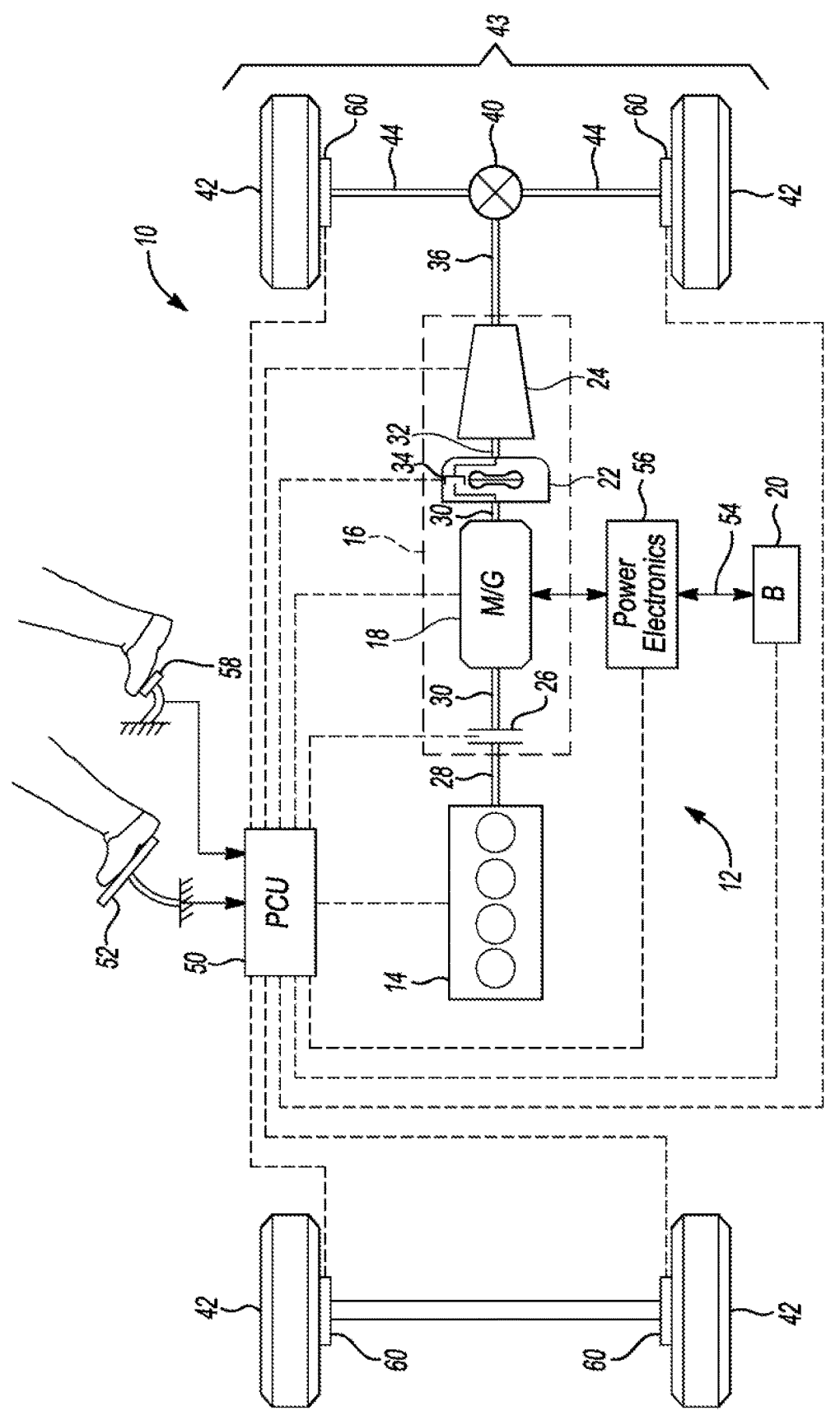
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16. As will be described in further detail below transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shall 30 extends through the M/G 18. The M/G 18 is continuously drivably connected to the shaft 30, whereas the engine 14 is drivably connected to the shall 30 only when the disconnect clutch 26 is at least partially engaged.

The M/G 18 is connected to the torque converter 22 via shall 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). For example, the gearbox 24 may be upshifted from a lower gear to a higher gear (e.g., from $3^{rd}$ gear to $4^{th}$ gear) during acceleration or may be downshifted from a higher gear to a lower gear (e.g., from $5^{th}$ gear to $4^{th}$ gear) when the vehicle is slowing down. Power and torque from both the engine 14 and the M/G 18 may be delivered to and received by gearbox 24. The gearbox 24 (then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective half shaft 44 connected to the differential 40. The differential 40 may be an open differential. The transmission output shaft 36 may also be referred to as an input shaft to the differential 40 and the half shafts 44 may be referred to as an output from the differential. Shaft 36, differential 40, half shafts 44 and a pair of the wheels 42 may form an axle 43. The vehicle may also include a second pair of wheels 42 that are not part of axle 43. The differential transmits approximately equal torque to each wheel 42 while permitting slight speed differences such as when the vehicle turns a corner. Each of the wheels 42 have tires that contact the road surface to propel the HEV 10. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood dial the powertrain control unit 50 and one or more other controllers can collectively be referred to as a "controller" that controls various actuators in response to signals from various sensors to control functions such as starting stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM). EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for case of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60, which may be disposed about each wheel 42. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shall 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking where the M/G 18 is utilized to slow the HEV 10. During regenerative braking torque and rotational energy or power from spinning wheels 42 is transferred back through the gearbox 24, torque converter 22, (and/or torque converter bypass clutch 34) and is converted into electrical energy for storage in the battery 20.

Referring to FIG. 1, a schematic diagram representative of a vehicle 10 and a vehicle powertrain 12 is illustrated. The powertrain 12 includes power generating components (e.g., engines or electric motors) and the drivetrain. The drivetrain is the group of components that deliver power to the driving wheels (e.g., gearbox 24, shaft 36, differential 40, and half shafts 44), excluding the power generating components. In contrast, the powertrain 12 is considered to include both the power generating components and the drivetrain. The powertrain 12 includes an engine 14 and a transmission 16. The transmission 16 may be configured to provide multiple gear ratios between an input and an output of the transmission 16.

The engine 14 is connected to the input of the transmission 16 while drivetrain components that are configured deliver power to driving wheels 18 are connected to an output shaft 20 of the transmission 16. The engine 14 may be connected to the input of the transmission by a torque converter or a launch clutch.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

For example, the configuration may include a single electric machine (e.g., M/G 18) that is connected to an open differential (e.g., differential 40) through an input shaft to the differential (i.e., shaft 36) and may include first and second wheels (i.e., wheels 42) that are each secured to one of the two output shafts of the open differential (i.e., half shafts 44). In this example, the open (or unlocked) differential is configured to provide the same torque (rotational force) to each of the half shafts and their respective wheels. A transmission (e.g., gearbox 24) and/or torque converter (e.g., torque converter 22) may be disposed between the electric machine and the open differential in this example configuration.

It should be understood that the vehicle configuration described herein is merely exemplary and is not intended to be limited. Other electric or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other electric or hybrid vehicle configuration known to a person of ordinary skill in the art.

Figure 2:
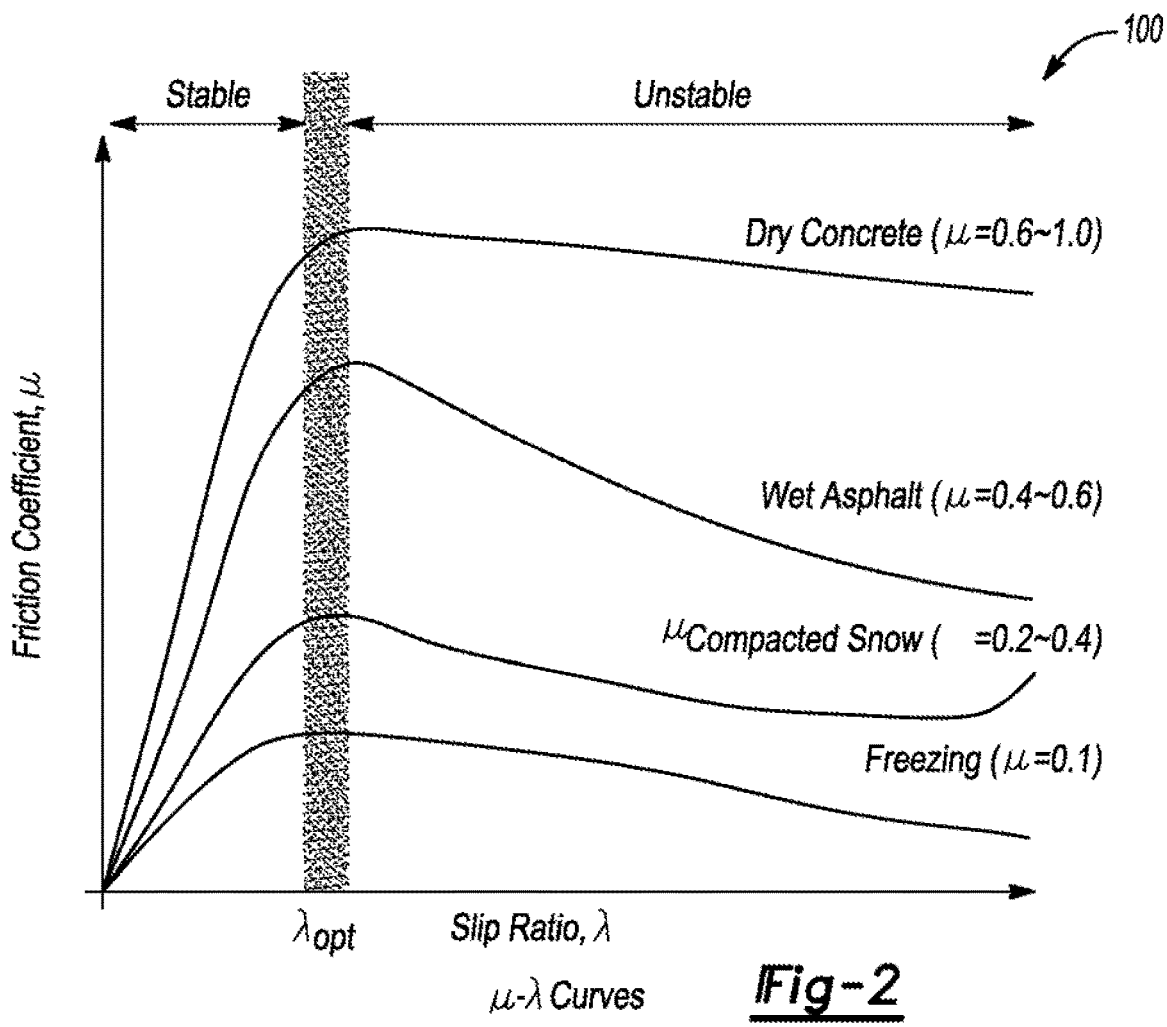
FIG. 2 is a graph that represents the relationship between the coefficient of friction between vehicle wheels and the road surface and the slip ratio of the vehicle.

Referring to FIG. 2, a graph 100 that represents the relationship between the coefficient of friction between the vehicle wheels and the road surface, μ, and the slip ratio of the vehicle, λ, under various road surfaces/conditions (e.g., dry concrete, wet asphalt, compacted snow, and freezing/icy roads) is illustrated. The slip ratio of the vehicle, λ, maybe defined by equation (1):

$$\lambda = \frac{V_w - V_c}{V_w} \quad (1)$$

where $V_w$ is the speed of one or more of the wheels 42 and $V_c$ is the speed of the vehicle 10.

Graph 100 illustrates that as the slip ratio, λ, increases, the stability (e.g., the ability to steer the vehicle in a desired direction) of the vehicle decreases. Increasing the slip ratio, λ, may also result in increasing the stopping distance of the vehicle. Increasing the slip ratio, λ, may be caused by an application of the friction brakes 60 that results in a locking of the wheels 42. In vehicles that include an Anti-lock Brake System (ABS), the ABS prevents the wheels 42 from locking up and reduces the total braking distance. When wheel lockup is detected based on estimating the slip ratio, λ, utilizing equation 1 above, the ABS reduces the pressure applied to the brake actuators (e.g., pneumatic or hydraulic pistons) and returns the wheels to a spinning sate. The vehicle 10 may include sensors that measure wheel speed and vehicle speed, which are then applied to equation 1 to estimate the slip ratio, $\lambda$. ABS can maximize the longitudinal tire-road friction while keeping large lateral forces. ABS is generally achieved through the control of hydraulic or pneumatic pressure for mechanical wheel brake actuators. ABS may pulse the pressure of the actuators such that the torque applied to the friction brakes increases and decreases cyclically (i.e., oscillates) along a wave (unction, such as a sine wave. This allows the vehicle operator to control (e.g., steer) the vehicle while maintaining the desired braking operation. During an anti-lock braking operation, an anti-lock braking controller may drive the slip ratio, $\lambda$, to an optimal band of slip ratios $\lambda_{opt}$, that is between stable and unstable slip ratio values, $\lambda$.

In vehicles that include electric machines that are capable regenerative braking (i.e., electric and hybrid vehicles), regenerative braking control is traditionally turned off when the ABS is active. The reason that regenerative braking control is traditionally turned off when the ABS is active, is that the regenerative brake torque from the electric machine lends to lock up the wheels on the axle that the electric machine is drawing kinetic energy from, which increasing the possibility of excess wheel slip. Such deactivation of the regenerative brake system substantially decreases the amount of energy recovered. The current application includes a control system that allows a vehicle to recover energy via regenerative braking while the ABS is active.

During an anti-lock braking event, the secondary braking system of a vehicle, which may include an electrical retarder (e.g., the M/G 18) that applies a retarding force to the vehicles drive wheels without use of friction, is typically disabled when the vehicle operates on the slippery road surfaces when the Anti-lock Braking System (ABS) of the vehicle is activated. A regenerative braking system (RBS) is a secondary braking system that may be utilized in Electric Vehicles (EVs) and Hybrid Electric Vehicles (HEVs).

On the other hand, it is possible to maintain a certain amount of regenerative braking torque during an ABS event (i.e., an event where anti-lock braking is desired and/or initiated) by using control strategies in order to recover energy. Some regenerative braking strategies during an ABS event may include:

Strategy 1: termination of regenerative braking during an ABS event;

Strategy 2: ramping down regenerative braking to zero with friction braking torque blending (only friction braking torque modulation for ABS purposes); and Strategy 3: maintaining regenerative braking torque at the same level or ramping down to a variable residual level.

The following three torque modulation cases may be to applied according to strategy 3:

Case 1: Only modulating friction braking torque for ABS purposes;

Case 2: Only modulating regenerative braking torque (friction brake torque will be adjusted to zero during the ABS event);

Case 3: Modulating regenerative braking torque and friction braking torque during the ABS event.

Regenerative braking control strategies may operate according to an open loop or a closed loop control strategy. Using a non-zero regenerative braking torque delivery during an ABS event will increase the amount of energy recaptured during the ABS event. However, use of non-zero regenerative braking may lead to vehicle instability and reduce handling behavior, especially during lateral maneuvers. The instability may be at least partially caused by the dynamics of the drivetrain and or driveline configurations of EVs and HEVs during the ABS event. For example, the cooperation of regenerative braking and ABS may influence the vehicle dynamics of vehicles having drivetrain configurations that include an electric machine lilted with an axial differential. During an ABS event where the friction brake torque is modulated, the application of regenerative braking torque (i.e., negative torque provided by the powertrain) may not only increase the wheel slip, but also may cause some problems on correct torque delivery along the driveline, particular for an electric machine fitted with an open differential.

Three typical drivetrain configurations that have one or more electric motors include drivetrains having in-wheel motors (individual hub motors), drivetrains having a single motor directly mounted in the front wheel axle or and rear wheel axle, and drive trains having an electric motor fitted with an open differential. The locus of this disclosure is geared toward the regenerative braking control strategy during an ABS event for vehicles with one electric motor and open differential.

Returning to FIG. 1, a four-channel ABS system may allocate a different friction brake torque valve for each wheel. The friction brake torque may be applied directly and independently to each wheel. The regen braking torque, generated by the electric motor and delivered by driveline shaft (i.e., shaft 36) and right left half shafts (i.e., shafts 44), is applied to both of left and right wheels 42 of axle 43. Within the driveline system (i.e., shaft gearbox 24, shaft 36, differential 40, half shafts 44, and wheels 42) exists shaft compliance, typical friction, time delay, and bearing resistance. In other words, nonlinear dynamics exists between the regenerative braking torque source (i.e., M/G 18) and the wheel/road surface. In addition, the left and right axial drive shafts (i.e., half shafts 44) characteristics may not be completely same, which may result in an asymmetry in torque delivery to the separate wheels 42.

Figure 3:
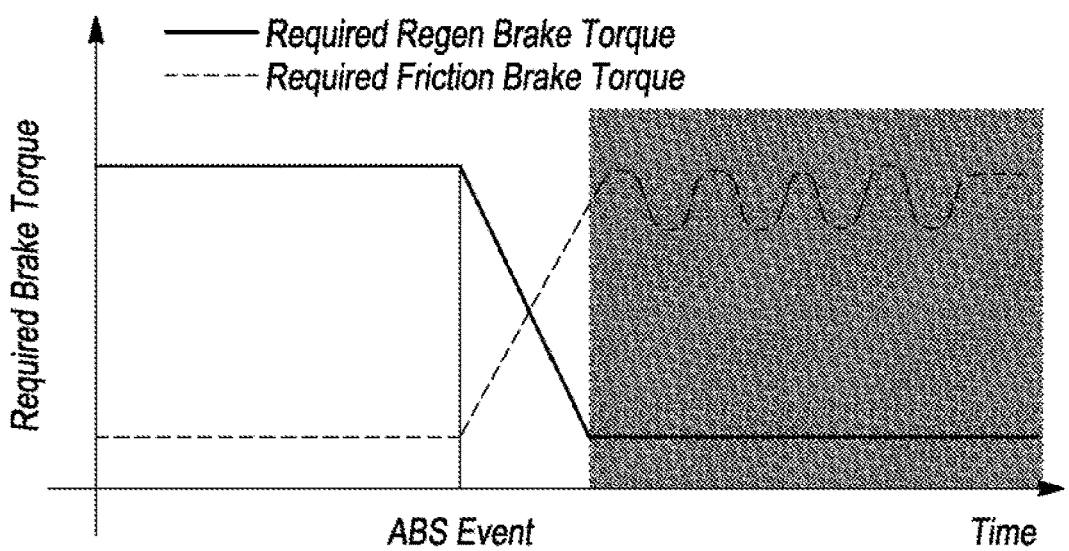
FIGS. 3-5 are graphs that illustrate friction braking torque and regenerative braking torque control strategies during an anti-lock braking event.

By using the strategy 1 and 2 above, the regenerative braking torque is instantly reduced to zero or ramp down to zero when ABS is activated. It avoids or reduces the interaction of regen braking and ABS braking. By using the strategy 3 according to case 1 as shown in the following FIG. 3, the regenerative braking torque is ramped down gradually to a variable level. The level of regenerative braking torque ensures obtaining a greater recapture energy ratio. The friction brakes 60 provide additional torque in order to meet the drivers deceleration request according to the non-zero regenerative braking torque level. The friction brake torque is implemented by ABS braking torque modulation. A vehicle that makes use of the strategy in FIG. 3, however, may be prone to frequent use of ABS, as a part of the braking torque will be out of the range of ABS control. This means that the delivered non-zero regenerative braking torque may generate an effect for the ABS control so that the part of ABS toque has to be used to reduce (compensate) the effect of non-zero regenerative braking torque. Therefore, it may be desirable according to the strategy in FIG. 3 to disable the secondary braking system in the slippery road for the conventional vehicles.

Figure 4:
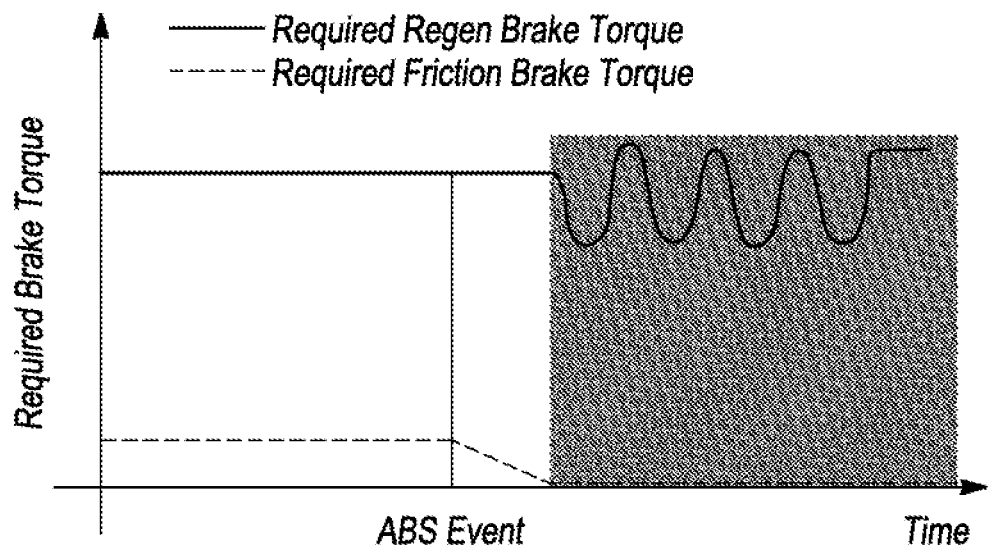

By using the strategy 3 according to case 2, the regenerative braking torque is modulated during an ABS event as shown in FIG. 4. Thus, the higher energy is recaptured in comparison with strategy 2. Moreover, as the braking torque modulations are preformed, the modulations are highly dependent the motor parameter and its characteristic and drivetrain/driveline configuration. Therefore, the drivetrain/driveline configuration is a key for the use of this strategy.

This strategy, however, may not be sufficient for a drivetrain having a single motor fitted with an open differential (e.g., FIG. 1) because it does not have friction braking torque blending control.

Figure 5:
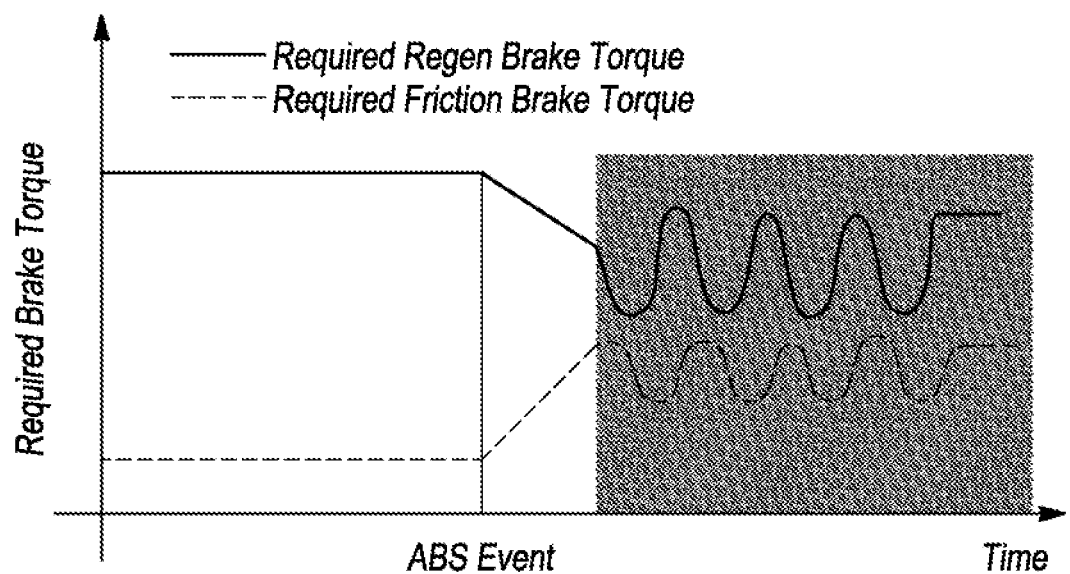

An integrated regenerative brake and friction brake control method during ABS event by using the strategy 3 according to case 3 is shown in FIG. 5. The method modulates regenerative braking torque to maintain the use of the secondary brake system (e.g., electric machine) during an ABS event. During the secondary brake torque modulation, the wheel slips are monitored and the secondary brake toque magnitude is reduced as soon as a slip threshold is reached. Using strategy 3 according to case 3 utilizing a low friction, μ, road surface and high level deceleration may result in one wheel slip being higher than the other wheel of an axle. The use of an open differential during the regenerative braking maneuver may cause an unequal lateral torque distribution because the left and right driveline shafts (e.g., half shafts 44) between the differential (e.g., differential 40) and wheels may have different lengths. As a result, an asymmetry in regen braking torque delivery into the separate wheels may result.

The above-mentioned controls to implement the strategy 3 are based on the open loop control. A closed loop based wheel slip proportional integral (PI) control application for regenerative braking may be applied during an ABS event during high deceleration braking maneuvers on a low friction, μ, road surface. Using such a closed loop based PI control application directly, however, may result in non-zero regenerative braking torque increasing slip of a single wheel of the axle, wheel lock-up, or backward wheel rotation for regenerative braking during ABS event.

Even though supervisory and monitory systems in the above-mentioned strategies can be added to limit regen braking torque, observe wheel slip, and introduce some other complex logics or apply the closed-loop feedback based PI control during ABS event, the stability and satisfactory braking performance may not be guaranteed by using the existed control strategies. The main reasons are due to: 1) drivetrain/driveline configurations—the complex dynamics from the regenerative braking source (e.g., M/G 18) to the wheels exist, resulting in uncertainties, variations, and possible asymmetry for the regenerative braking systems and regenerative braking torque delivery; and (2) that trial-and-error approaches have to be used to determine the needed parameters in the existed strategies during ABS event, such as regenerative braking torque level, modulated regenerative braking torque magnitude, and PI controller parameters, in the different operating conditions of vehicles. Such trial and error approach may not cover all real vehicle operation scenarios.

The goal of this disclosure is to develop a theory and a method of the integrated regenerative braking control and friction braking control to recapture the maximum amount of energy from the regenerative braking during ABS event under the following conditions (control constraints): (1) ABS must have control over the regenerative braking torque; (2) maintaining the same level of stop distance of vehicle in comparison with when ABS friction braking control is used independently; (3) maintaining vehicle stability (i.e., maintaining the required wheel slip), and (4) providing optimal and robust control performances during the operation of vehicle braking. The present disclosure discloses the control theory, system analysis, controller design, and real realization considerations of regenerative braking during ABS event. The approached problem may be referred to as the RBS-ABS Event, and solutions to the problem may be referred to as RBS-ABS Event controls or methods.

In the following description, variables with L or R subscription represent variables relative to the left wheel or the right wheel, respectively, while variables without an L or R subscription represent variable relative to both wheels collectively. For example, $T_{brakeL}$ and $T_{brakeR}$ represent the friction braking torque of the left and right wheels, respectively, while $T_{brake}$ represents the total collective friction braking torque of the right and left wheels.

Figures 6, 7:
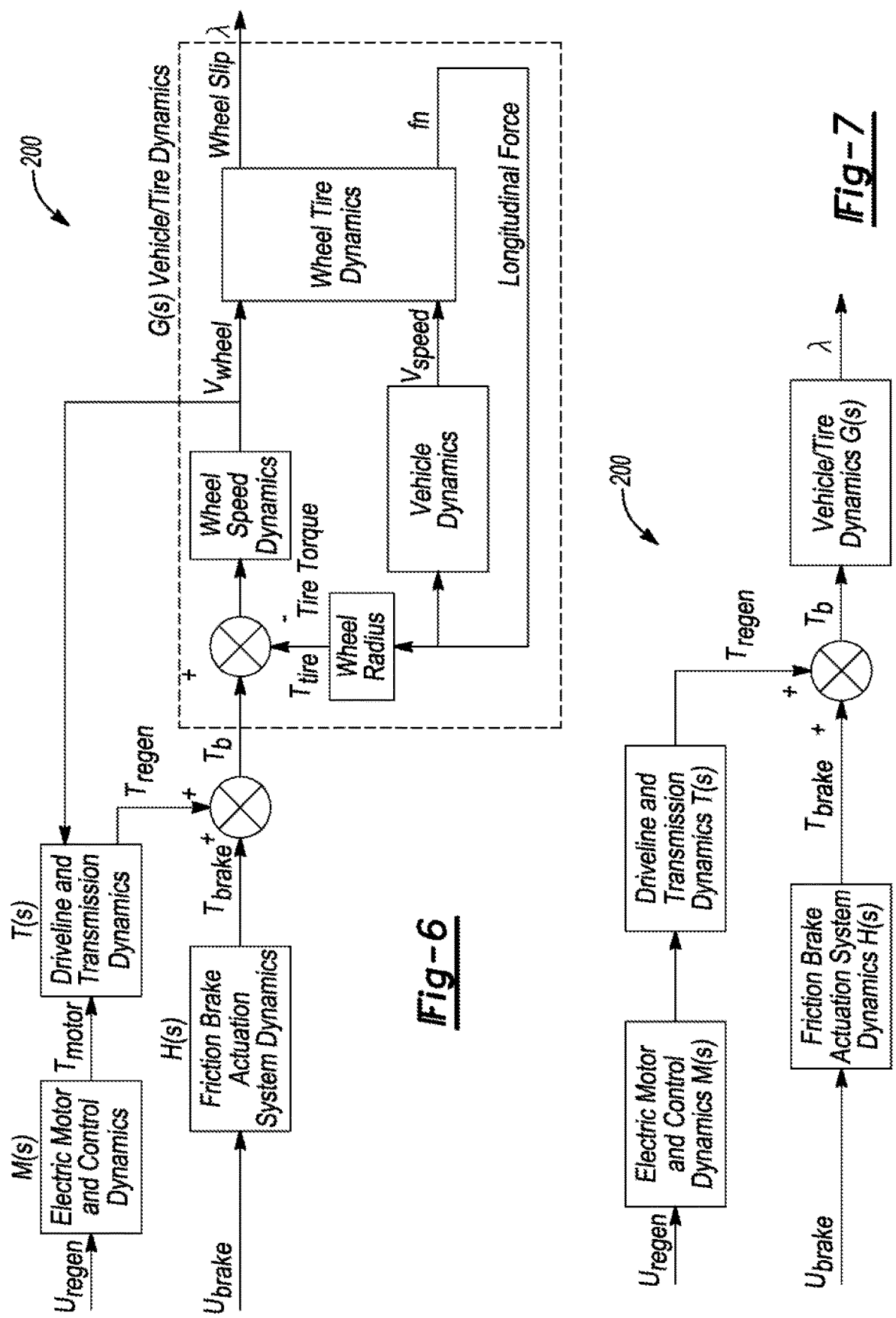
FIG. 6 is a block diagram illustrating a controlled plant for a vehicle braking system.
FIG. 7 is a block diagram illustrating a simplified version of the controlled plant in FIG. 6.

A schematic block diagram 200 of the controlled plant or system (i.e., HEV 10 in FIG. 1) is illustrated in FIG. 6. To describe the problem easily and conveniently, only dynamics of some main components and one wheel dynamics are shown in FIG. 6. In FIG. 6, the regenerative braking toque $T_{regen}$ is generated by an electric motor and delivered by an open differential driveline with a transmission gearbox. The friction brake toque $T_{brake}$ is generated by an electronic or hydraulic based friction brake actuation system. Both $T_{regen}$ and $T_{brake}$ may have negative values during the braking operation. The sum of $T_{regen}$ and $T_{brake}$ is $T_b$, which represents a total brake torque. $T_b$ is delivered to the wheels/tires and vehicle G(s) as an input torque. A fed or current tire torque $T_{tire}$ is subtracted from total brake torque $T_b$. As a result, wheel velocity $v_{speed}$ and longitudinal force $f_n$ of tires are generated, the longitudinal force generates vehicle velocity and is also fed to form the current tire toque $T_{tire}$. The slip ratio of each wheel, λ, during the braking operation is defined based on the driving wheels angular velocity and vehicle velocity ω ($V_{speed}$ in FIG. 6) and may be represented by equation (1a):

$$\lambda = \frac{r\omega - v_c}{r\omega} \tag{1a}$$

where r is tire or wheel radius. The wheel velocity is expressed as $V_w = r\omega$ (shown as $V_{wheel}$ in FIG. 6). It is noted that the wheel velocity $V_{wheel}$ is led to the driveline axles and as an expression of the effect from vehicle to driveline axles. The vehicle and tire dynamics G(s) shown in FIG. 6 is nonlinear and unstable in certain braking operation conditions. It is related with the tire/road surface friction coefficient, μ. The friction between the tires and road surface determines the maximum acceleration. If total brake torque $T_b$ exceeds the maximum acceleration, excessive wheel slip occurs and the a value moves or ramps toward a −1 value within the control system of FIG. 6, causing the system to become unstable.

The control system shown in FIG. 6 can be simplified as illustrated in FIG. 7. The control system shown in FIG. 7 is described by using the following transfer functions: vehicle and lire dynamics G(s), friction brake actuation system dynamics H(s), electric motor and electric motor controller dynamics M(s), and axial driveline and transmission dynamics T(s). The driveline and transmission dynamics T(s) represent the dynamics of the gearbox 24, the shaft 36 that connects the gearbox to the differential 40, and any other component that may be between the M/G 18 and the differential 40 (e.g., shaft 30, shaft 32, torque converter 22, etc.). Please note that the configuration may not have a torque converter and the M/G 18 may be connected directly to the input of the gearbox 24. In FIG. 7, the output variable is the wheel slip λ. The input variables in FIG. 7 are $u_{brake}$ to generate friction braking torque $T_{brake}$, and $u_{regen}$ to generate regenerative braking torque $T_{regen}$. The variables $u_{brake}$ and $u_{regen}$ are representative of signals indicative of a friction brake torque demand and a regenerative braking torque demand, respectively. More specifically, $u_{regen}$ may be a signal indicative of an electric current required to energize coils of the electric machine (e.g., M/G 18) to produce a desire torque of the electric machine while $u_{brake}$ may be signal indicative of a pressure of an actuator (e.g., a master cylinder) required to produce a desire torque of the friction brakes. Alternatively, $u_{brake}$ may be a signal indicative of an electric current required to produce a desired torque of friction brakes having and electric actuator, such as a solenoid. It is emphasized that the vehicle and tire dynamic G(s) is nonlinear and is also unstable in certain braking operation conditions, in particular, on a low friction, μ, road surface during a large acceleration of the vehicle. We refer such system with dynamics G(s) as being "conditional stable" when properly controlled.

When wheel slip λ is in stable range and an ABS event has not been activated, the control system shown in FIG. 7 is applied according to an open loop control method. The total brake torque $T_b$ is the sum of $T_{regen}$ and $T_{brake}$ when the brake toque blending control is applied. The input control variables $u_{brake}$ and $u_{regen}$ are determined by using blending control supervisory control logics according to the vehicle operation status and accelerator and brake pedal positions. To prevent excessive wheel slip and maintain vehicle stability, the ABS control is applied to control wheel slip λ to within a required range. As soon as the wheel slip λ exceeds the threshold and the ABS is activated, the friction brake input variable $u_{brake}$ is taken over by the ABS controller output with a feedback control loop. The wheel slip variable λ is fed to form a feedback loop and the ABS controller C(s) adjusts wheel slip λ to the desired reference value. This ABS enable and disable process is shown in FIG. 8.

Figure 8:
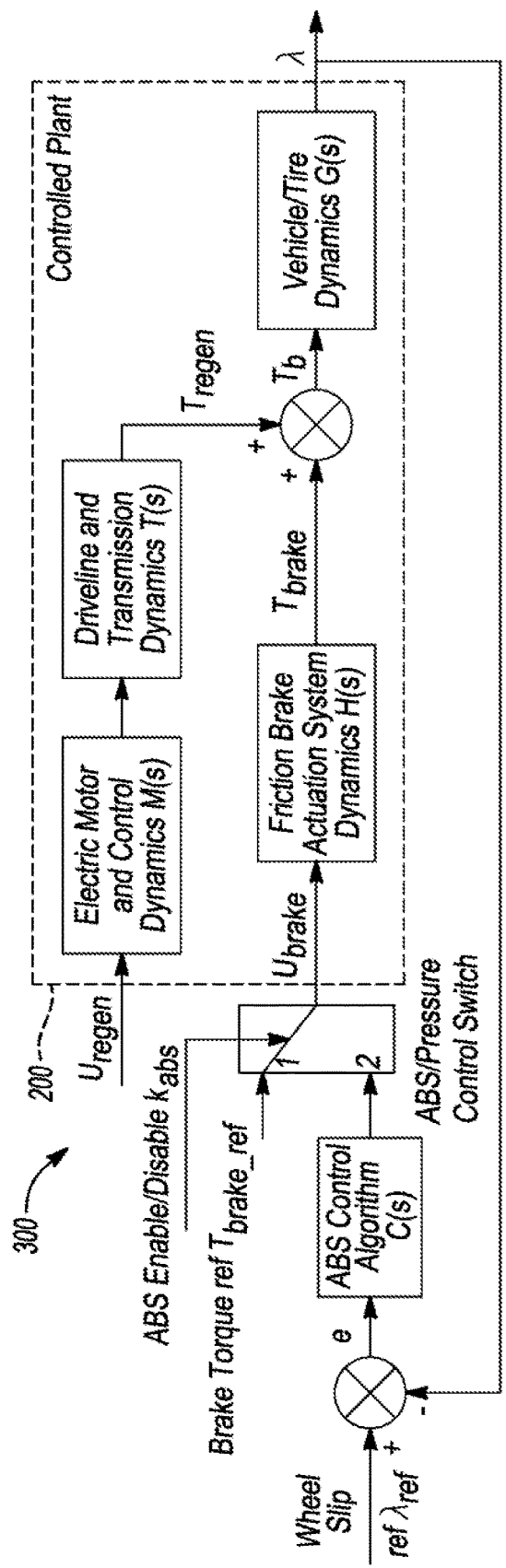
FIG. 8 is a block diagram illustrating a vehicle braking control system, where the control system includes a switching process between enabling and disabling anti-lock braking.

As shown as in the block diagram 300 of FIG. 8, the system operation status (ABS enable or disable) is determined by a switch position, and the switch position is controlled by signal $k_{abs}$. When the ABS enable/disable switch is in position 1 (Case 1), the control system operates in an open loop, as shown in FIG. 7. When the ABS enable and disable switch is in position 2 (Case 2), the control system operates in a closed loop. Let's analyze the two control systems ABS disable (Case 1) and ABS enable (Case 2) as follows.

Case 1—ABS is disabled:

In case 1, the normal torque blending control is applied according to the control system as shown in FIG. 7. The vehicle and wheels G(s) receives two parallel inputs $T_{brake}$, generated by $u_{brake}$, and $T_{regen}$, generated by $u_{regen}$, according to an open loop control. Two inputs are summed to generate total brake torque, $T_b$, which may be represented by equation (2):

$$T_b(s) = T_{brake}(s) + T_{regen}(s) \qquad (2)$$

The transfer function of the total brake torque, $T_b$, acting on the wheels may be represented by equation (3):

$$T_b(s) = H(s)u_{brake}(s) + M(s)T(s)u_{regen}(s) \qquad (3)$$

The open loop transfer function from two input control variables, $u_{brake}$ and $u_{regen}$ to the output wheel slip variable λ may be represented by equation (4):

$$\lambda(s) = G(s)T_b(s) = G(s)H(s)u_{brake}(s) + G(s)M(s)T(s)u_{regen}(s) \qquad (4)$$

It can be observed from equation (4) and FIG. 7 that the wheel slip λ is affected by two independent open loop controls. The effect for adjusting or controlling the wheel slip λ of each open loop is independent of the other open loop. More specifically, the friction brake control input $u_{brake}$ generates friction brake torque $T_{brake}$ independently of the regenerative brake torque $T_{regen}$, and the regenerative brake control input $u_{regen}$ generates regen brake torque $T_{regen}$ independently of the friction brake torque $T_{brake}$.

Figure 9:
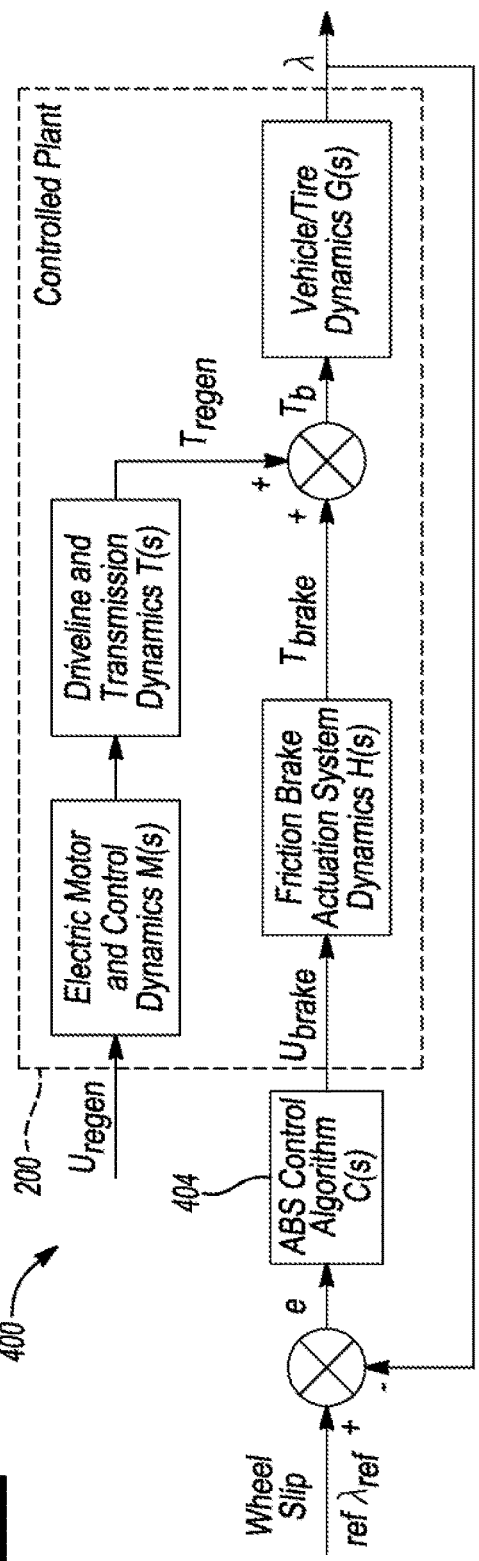
FIG. 9 is a block diagram illustrating the control system of FIG. 8, where the switch is positioned such that the friction brake torque is controlled according to a closed loop and the regenerative braking torque is controlled according to a feed forward or open loop.

Case 2—ABS is enabled:

When the ABS is activated, the control system shown in FIG. 8 is re-drawn as block diagram 400 in FIG. 9. The goal of the ABS controller is to control real wheel slip λ to the desired value $\lambda_{ref}$ by controlling its output variable $u_{brake}$ to adjust friction brake torque $T_{brake}$. As a result, the actual or real wheel slip λ is controlled to the level of desired value $\lambda_{ref}$. The ABS control system shown in FIG. 9 has similar functions with other general feedback control systems. For example, the ABS control system shown in FIG. 9 has a capability to reject (attenuate) external disturbances and to overcome the uncertainty of controlled plant 200. It means that any change in an external disturbance can cause $T_{brake}$ to automatically adjust. In summary, during an ABS event, the regenerative braking torque, $T_{regen}$, acts as an external disturbance for the closed loop ABS system. The closed loop ABS control tends to reject any disturbances, which may include regenerative braking torque. As a result, the performance of ABS may be degraded, and possible excessive wheel slip may result. More specifically, when a non-zero regenerative brake torque $T_{regen}$ is added by controlling its input variable $u_{regen}$ during an ABS event, the ABS controller 404 may automatically control the friction braking torque $T_{brake}$ to reject the regenertative brake torque $T_{regen}$. An ABS controller is described in U.S. patent application Ser. No. 16/355,084 filed on Mar. 15, 2019, the disclosure of which is hereby incorporated in its entirety by reference herein.

The closed loop transfer function of FIG. 9 may be described as equation (5):

$$\lambda(s) = \frac{C(s)H(s)G(s)}{1+C(s)H(s)G(s)}\lambda_{ref}(s) + \frac{M(s)T(s)G(s)}{1+C(s)H(s)G(s)}u_{regen}(s) \qquad (5)$$

The first item of equation (5) is the closed loop transfer function of the ABS control system with the wheel slip as an input $\lambda_{ref}$. The second item is the transfer function from regenerative brake torque open loop control with $u_{regen}$ as an input, which may act as an external disturbance for the ABS feedback control loop shown as the first item in equation (5).

When the regenerative brake torque control command $u_{regen}(s) = 0$, then the second half of equation (5) is zero and there is no external effect or disturbance on the ABS closed loop control via the regenerative braking. If $u_{regen}(s) \neq 0$, that is, the external regenerative braking torque is changed or maintained at a certain level, the ABS has to use the part of the friction brake torque $T_{brake}$ to overcome the effect of the external regenerative brake torque $T_{regen}$ during ABS events. Thus, the performance of ABS is degraded and possible wheel slipping may occur.

According to above analysis, the non-zero regenerative braking torque controls described with respect to equation (5) and FIGS. 6-9 may have undesirable result. Even though the regenerative brake torque actuation point (see the sum of $T_{regen}$ and $T_{brake}$ in FIG. 9) cannot be changed due to the physical system configuration, control system design may be used to change the control system architecture and convert the regenerative braking torque to an effective control variable in the RBS-ABS event problem. An RBS-ABS event controller design that corrects all of the deficiencies above is described as follows.

The design of an RBS-ABS event controller according to a first architecture (hereinafter architecture I) first includes re-writing equation (4), which is the open loop control system transfer function when ABS is disabled, as follows:

First start with equations (4a), which is the same as equation (4):

$$\lambda(s)=G(s)T_b(s)=G(s)H(s)u_{brake}(s)+G(s)M(s)T(s)u_{regen}(s) \quad (4a)$$

Next, the design includes introducing a pre-compensator $C_{pc}(s)$ into the regenerative brake control equation (4a) and defining $u_{regen}$ and $u_{brake}$ according to equations (6a) and (6b), respectively:

$$u_{regen}(s)=C_{pc}(s)\alpha_r u(s) \quad (6a)$$

$$u_{brake}(s)=\alpha_b u(s) \quad (6b)$$

where u is a common variable for $u_{brake}$ and $u_{regen}$, which are the friction braking torque control input and regenerative braking torque control input, respectively. More specifically, u may be representative of a signal that is indicative of a total torque demand, while $u_{brake}$ and $u_{regen}$ may be representative of signals indicative of a friction brake torque demand and a regenerative braking torque demand, respectively. The constant $\alpha_b$ and $\alpha_r$ are defined as weighting coefficients for $u_{brake}$ and $u_{regen}$, respectively. The weighting coefficients should satisfy the following relationship described in equation (7) in order to maintain the original ABS control performance:

$$\alpha_b + \alpha_r = 1 \quad (7)$$

Next, the design of the RBS-ABS event controller includes substituting equations (6a) and (6b) into equation (4a), which results in equation (8):

$$\lambda(s)=G(s)H(s)\alpha_b u(s)+G(s)M(s)T(s)C_{pc}(s)\alpha_r u(s) \quad (8)$$

If $H(s)*M(s)T(s)C_{pc}(s)$ is satisfied in equation (8), the pre-compensator $C_{pc}(s)$ may be described according to equation (9):

$$C_{pc}(s) = \frac{H(s)}{M(s)T(s)} \quad (9)$$

Next, the pre-compensator $C_{pc}(s)$ may be incorporated into the transfer function of equation (8), which then may be re-written as equation (10):

$$\lambda(s)=G(s)H(s)\alpha_b u(s)+G(s)H(s)\alpha_r u(s) \quad (10)$$

In terms satisfying the relationship described in equation (7), the transfer function (10) may be re-written as equation (11):

$$\lambda(s)=(\alpha_b+\alpha_r)G(s)H(s)u(s)=G(s)H(s)u(s) \quad (11)$$

Comparing equations (11) and (4a), the two torque control input variables $u_{regen}$ and $u_{brake}$ have been integrated into one input variable u by using the pre-compensator shown in equation (9) and by using the conversion equations of (6a) and (6b).

A closed loop transfer function for the system of equation (11) for controlling an RBS-ABS event includes one input variable u and output variable $\lambda$, and when incorporating the ABS controller C(s) the closed loop transfer function for the system of equation (11) may be given as equation (12):

$$\lambda(s) = \frac{C(s)H(s)G(s)}{1+C(s)H(s)G(s)}\lambda_{ref}(s) \quad (12)$$

Comparing the closed loop RBS-ABS event system transfer function of equation (12) and the original closed-loop based RBS-ABS event control system expressed as equation (5), the regenerative braking torque effect has been merged into the RBS-ABS controller by using the pre-compensator (9), variable conversions (6a) and (6b), and the other above conversions. The regenerative braking torque property is therefore converted from a disturbance toque to one of two parallel control torques. The variable conversion expressed in (6a) and (6b) of RBS-ABS controller may be referred to as the variable 2-1 conversion.

Figure 10:
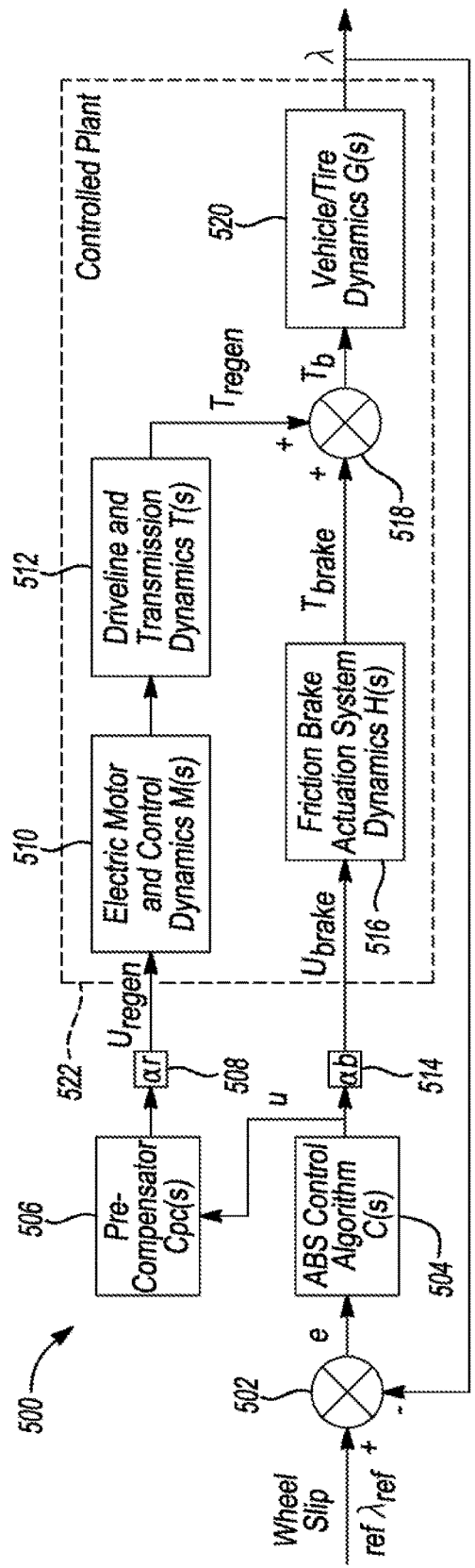
FIG. 10 is a block diagram illustrating a vehicle braking control system where the regenerative braking torque and friction brake torque are both controlled according to a closed loop and based on a common control signal.

FIG. 10 shows a block diagram 500 of the RBS-ABS event control system described by equation (12) with the pre-compensator of equation (9) and the conversion of equations (6a) and (6b), which represent a 2-1 conversion to convert regenerative braking torque from disturbance to one of the control torques. In FIG. 10, the difference e between the actual wheel slip $\lambda$ and the desired wheel slip $\lambda_{ref}$ is determined at subtraction block 502. The difference e is then input into the ABS controller C(s) at block 504. The ABS controller then outputs u, which may be representative of a signal that is indicative of a total torque demand. The signal u is adjusted by the pre-compensator $C_{pc}(s)$ at block 506 and the regenerative braking weighting coefficient $\alpha_r$ at block 508 to produce the signal $u_{regen}$ that is indicative of the regenerative braking torque demand. More, specifically, the signal u may be multiplied by the regenerative braking weighting coefficient $\alpha_r$ at block 508 to produce the signal $u_{regen}$ that is indicative of the regenerative braking torque demand. The signal $u_{regen}$ is then adjusted according to the electric motor and the electric motor controller dynamics transfer function M(s) at block 510 and the axial driveline and transmission dynamics transfer function T(s) at block 512 to produce the regenerative braking toque $T_{regen}$.

The signal u is also adjusted by the friction braking weighting coefficient $\alpha_b$ at block 514 to produce the signal $u_{brake}$ that is indicative of the friction braking torque demand. More, specifically, the signal u may be multiplied by the friction braking weighting coefficient $\alpha_b$ at block 514 to produce the signal $u_{brake}$ that is indicative of the friction braking torque demand. The signal $u_{brake}$ is then adjusted according to the friction brake actuation system dynamics transfer function H(s) at block 516 to produce the friction braking toque $T_{brake}$. The regenerative braking toque $T_{regen}$ and the friction braking toque $T_{brake}$, are then added together at summation block 518 to produce the total brake torque $T_b$. The total brake torque $T_b$ is then delivered to the vehicle and tire dynamics at block 520, which is represented by G(s). Block 520 then outputs the actual wheel slip $\lambda$, which is then fed back to subtraction block 502. The controlled plant 522 includes the electric motor and electric motor controller dynamics M(s), the axial driveline and transmission dynamics T(s), the friction brake actuation system dynamics transfer function H(s), summation block 518, and the vehicle and tire dynamics G(s).

The RBS-ABS event control system described by equation (12) and illustrated by block diagram 500 in FIG. 10 is configured to adjust both the regenerative braking toque $T_{regen}$ and friction braking toque $T_{brake}$ to maintain or drive the actual wheel slip $\lambda$ at or toward the desired wheel slip $\lambda_{ref}$ while also maximizing the amount of regenerative braking toque $T_{regen}$. The RBS-ABS event control system described by equation (12) and illustrated by block diagram 500 may be activated in response to and or during an anti-lock braking event.

From equation (12) and FIG. 10, it can be observed that the RBS-ABS event control system 500 integrates friction brake control and regenerative braking control into a unified framework. In other words, the regenerative braking control input $u_{regen}(s)$ and friction brake control input $u_{brake}(s)$ are integrated with the friction brake control variable u, which is the ABS controller 504 output, so that the two torque control inputs, $u_{regen}(s)$ and $u_{brake}(s)$, are controlled by a common torque control input variable u. By integrating $u_{regen}(s)$ and $u_{brake}(s)$ with the friction brake control variable u, the RBS-ABS event control system 500 can satisfy the stability and performance of RBS-ABS event control system similar to a traditional ABS system that only controls friction brakes.

It is noticed that the dynamics are same for regenerative braking control loop and friction braking control loop in the RBS-ABS event control system 500. The portion of the torque command output u of the ABS controller 504 that is directed to the friction brakes $u_{brake}$ is taken over by the regenerative braking torque control in the RBS-ABS event control strategy of FIG. 10. The ratio of regenerative braking torque and friction braking torque is represented by equation (7). Therefore equation (7) determines how much regenerative braking torque is delivered. When the friction braking torque coefficient $\alpha_b$ is 1 and the regen braking torque coefficient $\alpha_r$ is 0, then only friction braking torque is delivered, and the RBS-ABS event controller 500 functions similar to a traditional ABS system that only controls friction brakes. When $\alpha_b$ is 0 and $\alpha_r$ is 1, only regenerative braking torque is delivered. When $\alpha_b$ is 0.5 and $\alpha_r$ is 0.5, 50% friction braking torque and 50% regen braking torque are delivered at the same lime. In other words, both the regenerative brake control loop and the friction brake control loop deliver the ABS controller 504 output u to generate the total braking torque.

Figure 11:
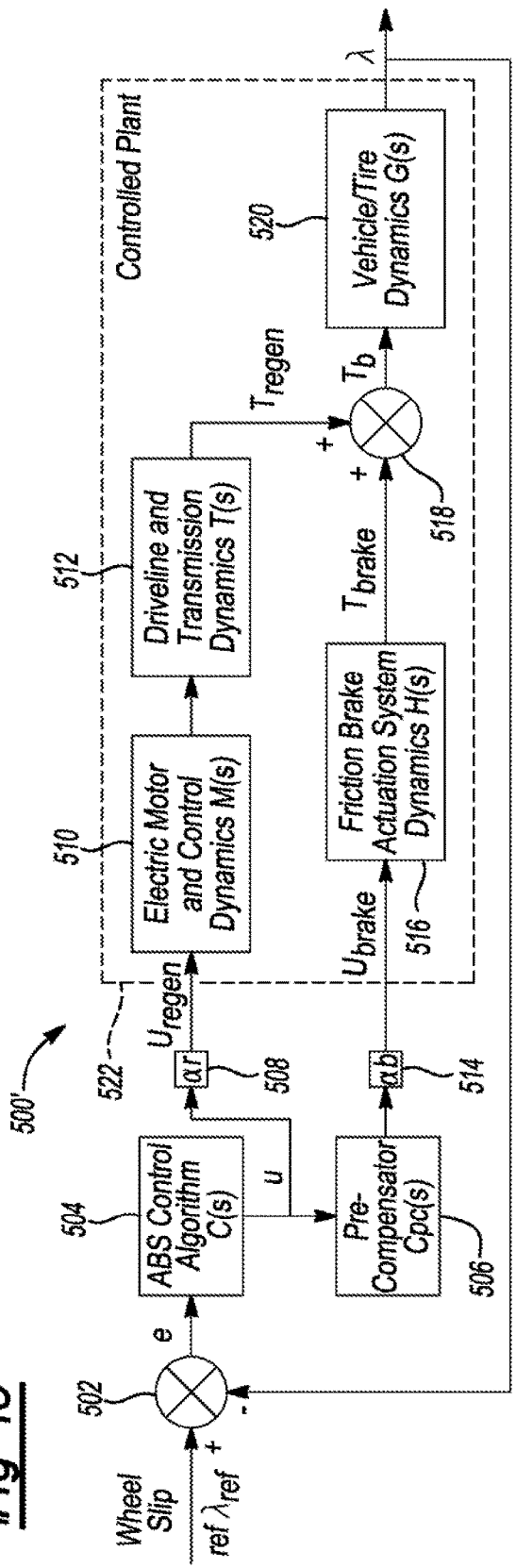
FIG. 11 is a block diagram illustrating an alternative version of the vehicle braking control system of FIG. 10.

Referring to FIG. 11, an alternative embodiment of an RBS-ABS event controller 500 is illustrated. The RBS-ABS event controller 500 is essential the same as RBS-ABS event controller 500 with the exception that the pre-compensator $C_{pc}(s)$ is utilized to adjust the friction brake control as opposed to the regenerative brake control. FIG. 11 represents the design of an RBS-ABS event controller according to a second architecture (hereinafter architecture II).

The architecture II design of the RBS-ABS event controller 500 includes introducing a pre-compensator $C_{pc}(s)$ into the friction brake control equation (4a) and defining $u_{regen}$ and $u_{brake}$ according to equations (13a) and (13b), respectively:

$$u_{regen}(s) = \alpha_r u(s) \quad (13a)$$

$$u_{brake}(s) = C_{pc}(s)\alpha_b u(s) \quad (13b)$$

Next, the design includes substituting equations (13a) and (13b) into equation (4a), which results in equation (14):

$$\lambda(s) = G(s)H(s)C_{pc}(s)\alpha_b u(s) + G(s)M(s)T(s)\alpha_r u(s) \quad (14)$$

If $H(s)C_{pc}(s)=M(s)T(s)$ is satisfied in equation (14), the pre-compensator $C_{pc}(s)$ may be described according to equation (15):

$$C_{pc}(s) = \frac{M(s)T(s)}{H(s)} \quad (15)$$

Next, the pre-compensator $C_{pc}(s)$ may be incorporated into the transfer function of equation (14), which then may be re-written as equation (16):

$$\lambda(s)=G(s)M(s)T(s)\alpha_b u(s)+G(s)M(s)T(s)\alpha_r u(s) \quad (16)$$

In terms satisfying the relationship described in equation (7), the transfer function (16) may be re-written as equation (17):

$$\lambda(s)=(\alpha_b \alpha_r)G(s)M(s)T(s)u(s) \leq G(s)M(s)T(s)u(s) \quad (17)$$

Compare equations (17) and (4a), the two torque control input variables $u_{regen}$ and $u_{brake}$ have been integrated into the one common input variable u. At the same time, the open loop transfer function is also been changed from G(s)H(s) of the friction braking torque loop to G(s)M(s)T(s) of the regen braking torque loop. Furthermore, a closed loop transfer function for the system of equation (17) for controlling an RBS-ABS event includes one input variable u and output variable λ, and when incorporating the ABS controller C(s) the closed loop transfer function for the system of equation (18) may be given as equation (18):

$$\lambda(s) = \frac{C(s)G(s)M(s)T(s)}{1+C(s)G(s)M(s)T(s)}\lambda_{ref}(s) \quad (18)$$

where C(s) is RBS-ABS event controller 504 to maintain control system stability and to satisfy the required performances.

Comparing the closed RBS-ABS event system transfer function of equation (18) and the original closed-loop based RBS-ABS event control system expressed as equation (5), the regenerative braking torque has been merged to into the RBS-ABS event controller output by using the pre-compensator (15), variable conversions (13a) and (13b), and the other above conversions. The regen braking torque properly is therefore converted from a disturbance toque to one of two parallel control torques. FIG. 11 shows the block diagram 500 of the RBS-ABS event control system described by equation (18) with the pre-compensator (15) and the variable 2-1 conversion (13a) and (13b).

In the both of RBS-ABS controller architecture I and II, the regenerative braking torque generated by a single motor (e.g., M/G 18) is controlled by the ABS control variable u. Usually, there are two independent ABS control channels for left and right wheels. Therefore, it must be determined, which ABS control variable, i.e., a left wheel or right wheel control ABS variable, $u_L$ and $u_R$ respectively, shall be used to replace the control variable u in equations (6) and (13). The control variables $u_L$ and $u_R$ may be representative of signals that are indicative of a total torque demand to left and right wheels of axle (e.g., axle 43).

When one of wheel ABS variable $u_L$ or $u_R$ is selected as the primary control variable u, the other wheel ABS control variable $u_L$ or $u_R$ is subtracted by a product weighting coefficient $\alpha_r$ and variable $u_L$ or $u_R$ because the regenerative braking torque which generated by the single motor (M/G 18) is distributed to the left wheel and the right wheel. Thus, both of led and right wheel ABS loop gains need to be adjusted because part or all of friction braking torques of the left and right wheels is being replaced the regenerative braking torque.

Figure 12:
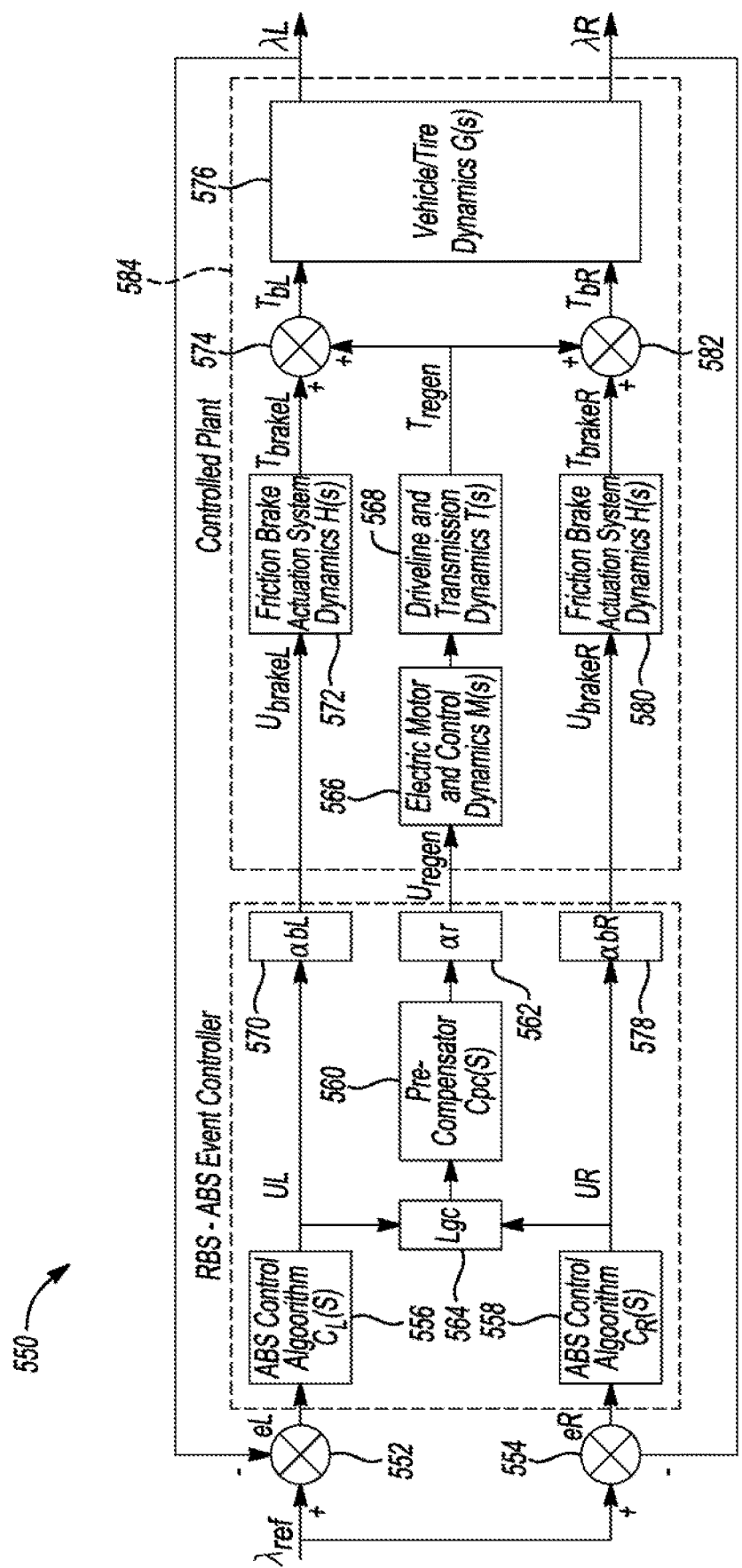
FIG. 12 is a block diagram of an RBS-ABS event controller for a vehicle braking control system where the regenerative braking torque, the friction brake torque of a first wheel of an axle, and the friction brake torque of a second wheel of the axle are all controlled according to a pair of closed loops and a regenerative braking torque variable that is based on a pair of input control signals.
Figure 13:
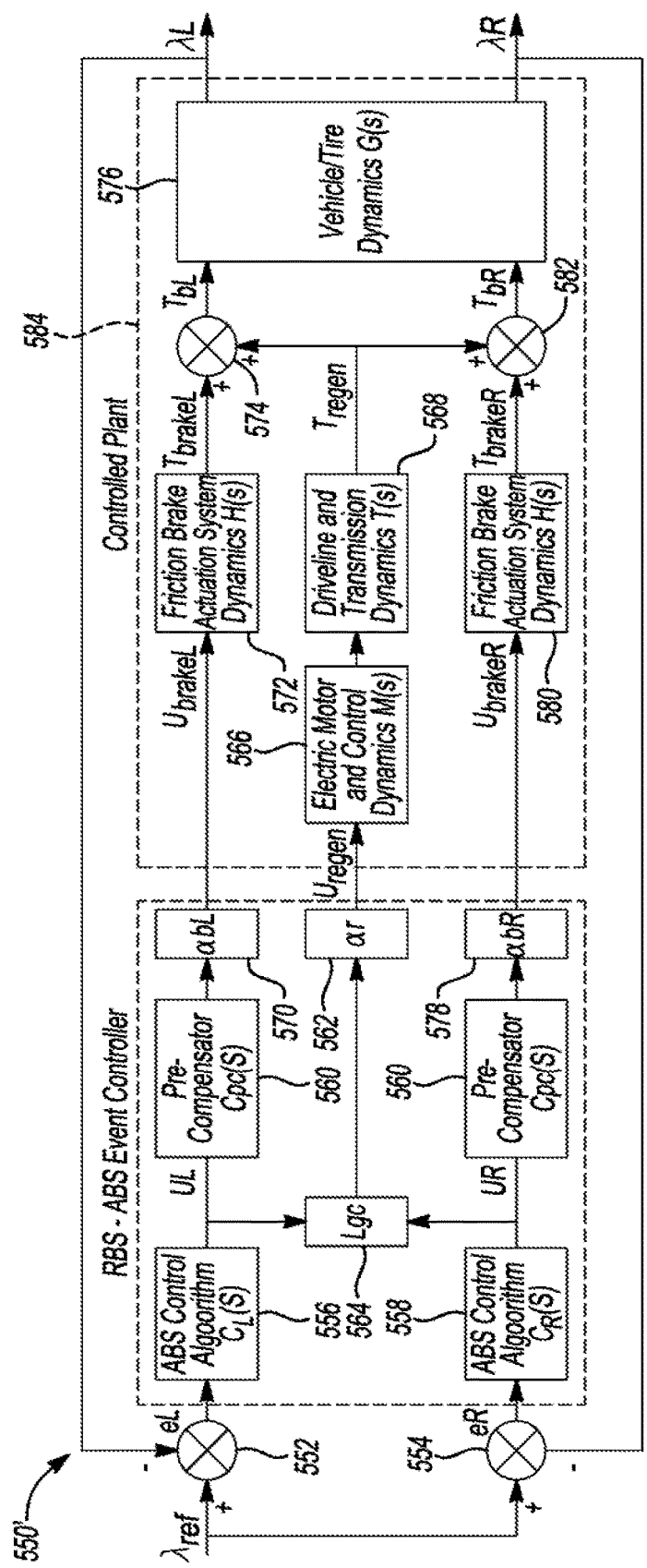
FIG. 13 is a block diagram illustrating an alternative version of the vehicle braking control system of FIG. 12.

To match original ABS only control performance, the definition of weighting coefficients in equation (7) is adjust to:

$\alpha_{bL}+\alpha_r=1$ when the let) wheel ABS is selected as the primary control variable for regenerative braking control, or $\alpha_{bR}+\alpha_r=1$, when right wheel ABS is selected as the primary control variable for regenerative braking control, where $\alpha_{bL}$, $\alpha_{bR}$, and $\alpha_r$ are the torque control input variable weighting coefficients for the friction braking of left wheel, the friction braking of the right wheel, and regenerative braking, respectively. FIG. 12 and FIG. 13 show the RBS-ABS event control systems with the controller architecture I and II for vehicle with left and right wheel ABS controls, respectively.

FIG. 12 represents a block diagram of RBS-ABS event controller 550 according to architecture I for a vehicle with separate left and right wheel ABS controllers. In FIG. 12, the difference $e_L$ between the actual wheel slip $\lambda_L$ of the left wheel and the desired wheel slip $\lambda_{ref}$ is determined at subtraction block 552. The difference $e_R$ between the actual wheel slip $\lambda_R$ of the right wheel and the desired wheel slip $\lambda_{ref}$ is determined at subtraction block 554. The difference $e_L$ is input into the left wheel ABS controller $C_L(s)$ at block 556. The left wheel ABS controller then outputs $u_L$, which may be representative of a signal that is indicative of a left wheel total torque demand. The difference $e_R$ is input into the right wheel ABS controller $C_R(s)$ at block 558. The right wheel ABS controller then outputs $u_R$, which may be representative of a signal that is indicative of a right wheel total torque demand. Either the $u_L$ or $u_R$ signal is then adjusted by a pre-compensator $C_{pc}(s)$ at block 560 and the regenerative braking weighting coefficient $\alpha_r$ at block 562 to produce the signal $u_{regen}$ that is indicative of the regenerative braking torque demand. More, specifically, either the $u_L$ or $u_R$ signal may be multiplied by the regenerative braking weighting coefficient $\alpha_r$ at block 562 to produce the signal $u_{regen}$ that is indicative of the regenerative braking torque demand. Prior to the pre-compensator 560, a control logic block 564 is utilized to select which of the left or right wheel friction brake control variables $u_L$ or $u_R$ will be utilized as the primary input variable for controlling regenerative braking based on control logic $L_{gc}$, which is discussed further below. The signal $u_{regen}$ is then adjusted according to the electric motor and the electric motor controller dynamics transfer function $M(s)$ at block 566 and the axial driveline and transmission dynamics transfer function $T(s)$ at block 568 to produce the regenerative braking toque $T_{regen}$.

The signal $u_L$ is also adjusted by the left wheel friction braking weighting coefficient $\alpha_{bL}$ at block 570 to produce the signal $u_{brakeL}$ that is indicative of a left wheel friction braking torque demand. More, specifically, the signal $u_L$ may be multiplied by the left wheel friction braking weighting coefficient $\alpha_{bL}$ at block 570 to produce the signal $u_{brakeL}$ that is indicative of the left wheel friction braking torque demand. It should be pointed out that when $u_{regen}$ and $u_{brakeL}$, satisfy (6a) and (6b), another signal $u_{brakeR}=u_R-\alpha_r u_L$ (not show in FIG. 12) is generated as the right wheel friction braking torque because the regenerative braking torque is distributed to the left wheel and the right wheel at the same time. The signal $u_{brakeL}$ is then adjusted according to the friction brake actuation system dynamics transfer function $H(s)$ at block 572 to produce the left wheel friction braking toque $T_{brakeL}$. The regenerative braking toque $T_{regen}$, or a fraction the regenerative braking torque that is distributed to the left wheel, and the left wheel friction braking toque $T_{brakeL}$, are then added together at summation block 574 to produce the left wheel total brake torque $T_{bL}$. The left wheel total brake torque $T_{bL}$ is then delivered to the vehicle and tire dynamics at block 576, which is represented by $G(s)$. Block 576 then outputs the actual wheel slip $\lambda_L$ of the left wheel, which is then fed back to subtraction block 552.

The signal $u_R$ is also adjusted by the right wheel friction braking weighting coefficient $\alpha_{bR}$ at block 578 to produce the signal $u_{brakeR}$ that is indicative of a right wheel friction braking torque demand. More, specifically, the signal $u_R$ may be multiplied by the right wheel friction braking weighting coefficient $\alpha_{bR}$ at block 578 to produce the signal $u_{brakeR}$ that is indicative of the right wheel friction braking torque demand. It should be pointed out that when $u_{regen}$ and $u_{brakeR}$ satisfy (6a) and (6b), another signal $u_{brakeL}=u_L-\alpha_r u_R$ (not show in FIG. 12) is generated as the left wheel friction braking torque because the regenerative braking torque is distributed to the left wheel and the right wheel at the same time. The signal $u_{brakeR}$ is then adjusted according to the friction brake actuation system dynamics transfer function $H(s)$ at block 580 to produce the right wheel friction braking toque $T_{brakeR}$. The regenerative braking toque $T_{regen}$, or a fraction the regenerative braking torque that is distributed to the right wheel, and the right wheel friction braking toque $T_{brakeR}$, are then added together at summation block 582 to produce the right wheel total brake torque $T_{bR}$. The right wheel total brake torque $T_{bR}$ is then delivered to the vehicle and tire dynamics at block 576, which is represented by $G(s)$. Block 576 then outputs the actual wheel slip $\lambda_R$ of the right wheel, which is then fed back to subtraction block 554.

The controlled plant 584 illustrated in FIG. 12 includes the electric motor and electric motor controller dynamics $M(s)$, the axial driveline and transmission dynamics $T(s)$, the friction brake actuation system dynamics transfer function $H(s)$, summation block 574, summation block 582, and the vehicle and tire dynamics $G(s)$. The RBS-ABS event controller illustrated in FIG. 12 includes ABS controllers $C_L(s)$ and $C_R(s)$, control logic $L_{gc}$, Pre-compensator $C_{PC}(s)$, and weighting coefficient $\alpha_{bR}$, $\alpha_{bR}$, and $\alpha_{bR}$.

FIG. 13 represents a block diagram of RBS-ABS event controller 550' according to architecture II for a vehicle with separate left and right wheel ABS controllers. The block diagram in FIG. 13 is similar to the block diagram in FIG. 12, except the pre-compensator is being utilized to adjust friction braking torque as opposed to the regenerative braking torque in FIG. 12.

When the two wheels travel on surfaces with different coefficients of friction μ, the friction braking control variable $u_L$ or $u_R$ of the wheel on the lower friction road surface should be used as a regen braking control variable. If the control variable $u_L$ or $u_R$ of the wheel traveling on higher friction road surface is used, it may result in overaggressive regenerative braking torque, which may degrade the ABS control performance of the wheel on die lower friction surface, which may result in undesirable wheel slip (i.e., wheel slip that is greater than the desired value $\lambda_{ref}$).

Figure 14:
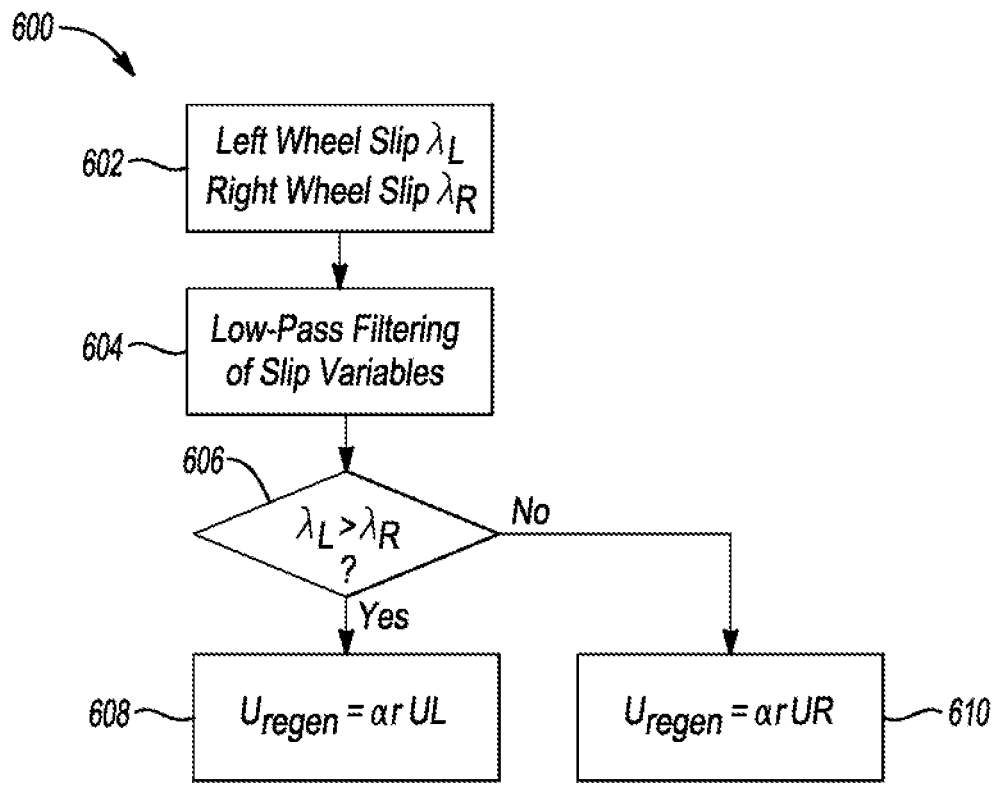
FIG. 14 is a flowchart illustrating a control logic that is utilized to determine which of the pair of input signals is utilized to control regenerative braking torque in the vehicle braking control system of FIG. 12 and FIG. 13.

Thus, the direct method according to the logic $L_{gc}$ is to estimate the coefficient of friction between the tire and the road surface μ. When coefficient of friction between the tire and the road surface μ is not available, the wheel slip ratio λ value may be utilized. FIG. 14 shows the flowchart of the logic $L_{gc}$ when wheel slip ratio λ is utilized. The wheel with larger wheel slip is selected, and its control variable (either $u_L$ or $u_R$) is used to obtain the regenerative torque control ($u_{regen}$). First the slips of the left wheel $\lambda_L$ and the right wheel $\lambda_R$ are input from block 602 into a low pass filter at block 604. The low pass filter 604 generates the filtered road wheel slip ratios (i.e, $\lambda_L$ and $\lambda_R$) and inputs the filtered road wheel slip ratios into decision block 606. If the left wheel slip $\lambda_L$ is greater than the right wheel slip $\lambda_R$ at decision block 606, then $u_{regen}=\alpha_r u_L$ at block 608. If the left wheel slip $\lambda_L$ is not greater than the right wheel slip $\lambda_R$ at decision block 606, then $u_{regen}=\alpha_r u_R$ at block 610.

The weighting coefficient $\alpha_r$ defines how much braking torque is delivered by the regenerative braking loop. If $\alpha_r$ is set to zero, no regen braking torque is delivered and the RBS-ABS event control controls friction braking only. If $\alpha_r$ is be set to its maximum value (i.e., $\alpha_r=1$), then the vehicle is free of ABS control. Generally, the friction brakes supply the additional torque in order to meet the driver's deceleration request because the maximum regenerative braking torque level $T_{regen}$ is usually not enough. The principle in determining $\alpha_r$ is to generate the most possible regen braking torque. Two methods may be utilized to determine the optimal $\alpha_r$.

Figure 15:
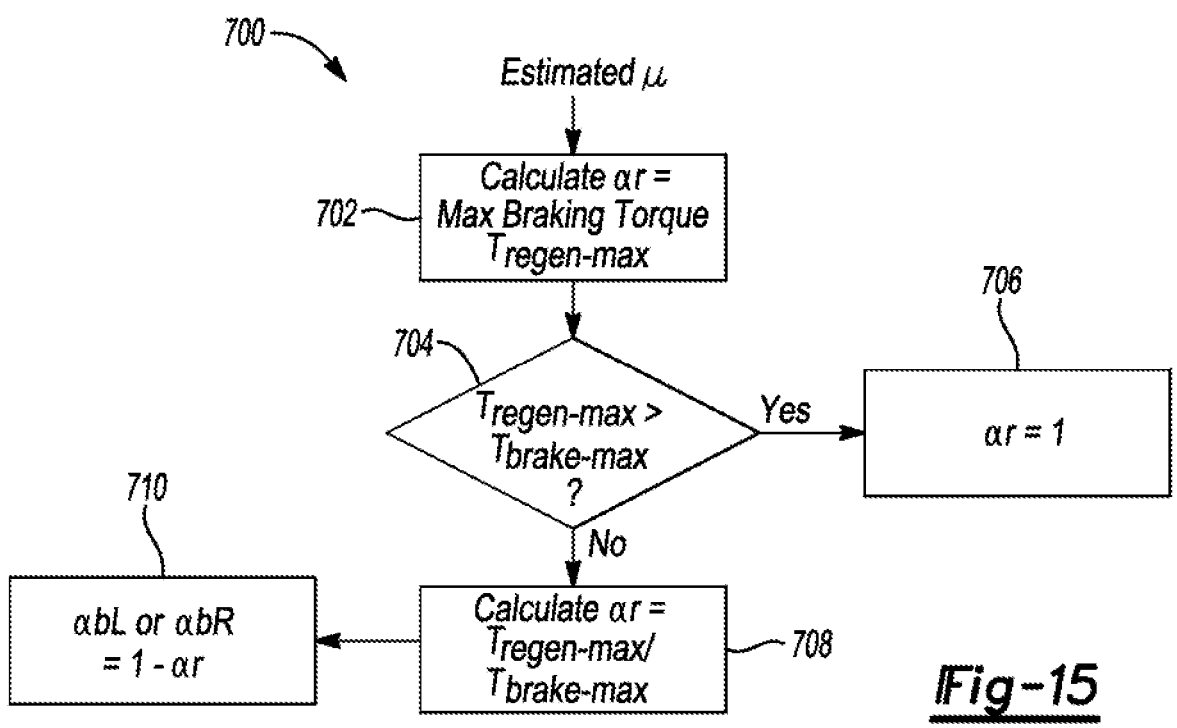
FIG. 15 is a flowchart illustrating a first method of calculating the friction braking and regenerative braking weighting coefficients.

The first method (hereinafter referrer to method 1) which is represented by the flowchart 700 in FIG. 15, includes determining the weighting coefficient $\alpha_r$ according to the real time estimate of the coefficient of friction between the tire and the road surface $\mu$, which is input into block 702. Next, the maximum braking torque possible on any particular axle before wheel lock occurs is determined at block 702 according to $T_{brake-max}=F_{brake-max}R=(M*G*\mu)R$, where R is the tire radius, $F_{brake-max}$ total possible braking maximum force on the axle (Nm), M vehicle axle mass (kg), and g acceleration due to gravity (m/sec$^2$), and $\mu$ is the coefficient of friction between the road and tire. If $\mu$ can be estimated, the maximum braking torque $T_{brake-max}$ can be obtained. The maximum regenerative braking torque $T_{regen-max}$ of the electric machine or motor (e.g., M/G 18) may be obtained from its torque-speed characteristic curve of the particular electric machine or motor. Based on the maximum braking torque $T_{regen-max}$ and the maximum regenerative braking torque $T_{regen-max}$, the weighting coefficient $\alpha_r$ may be determined according to decision block 704. If $T_{regen-max}>T_{brake-max}$ at block 704 the electric motor (e.g., M/G 18) has the capacity to generate the required maximum braking torque and the method moves on to block 706 where $\alpha_r=1$. If $T_{regen-max}<T_{brake-max}$ at block 704 the electric motor does not have enough capacity generate the required maximum braking torque and the method moves on to blocks 708 and 710 where $\alpha_r=T_{regen-max}/T_{brake-max}$, which is less than 1, and $\alpha_{bL}$ or $\alpha_{bL}$ (depending on which is controlling) is set to $1-\alpha_r$.

Figure 16:
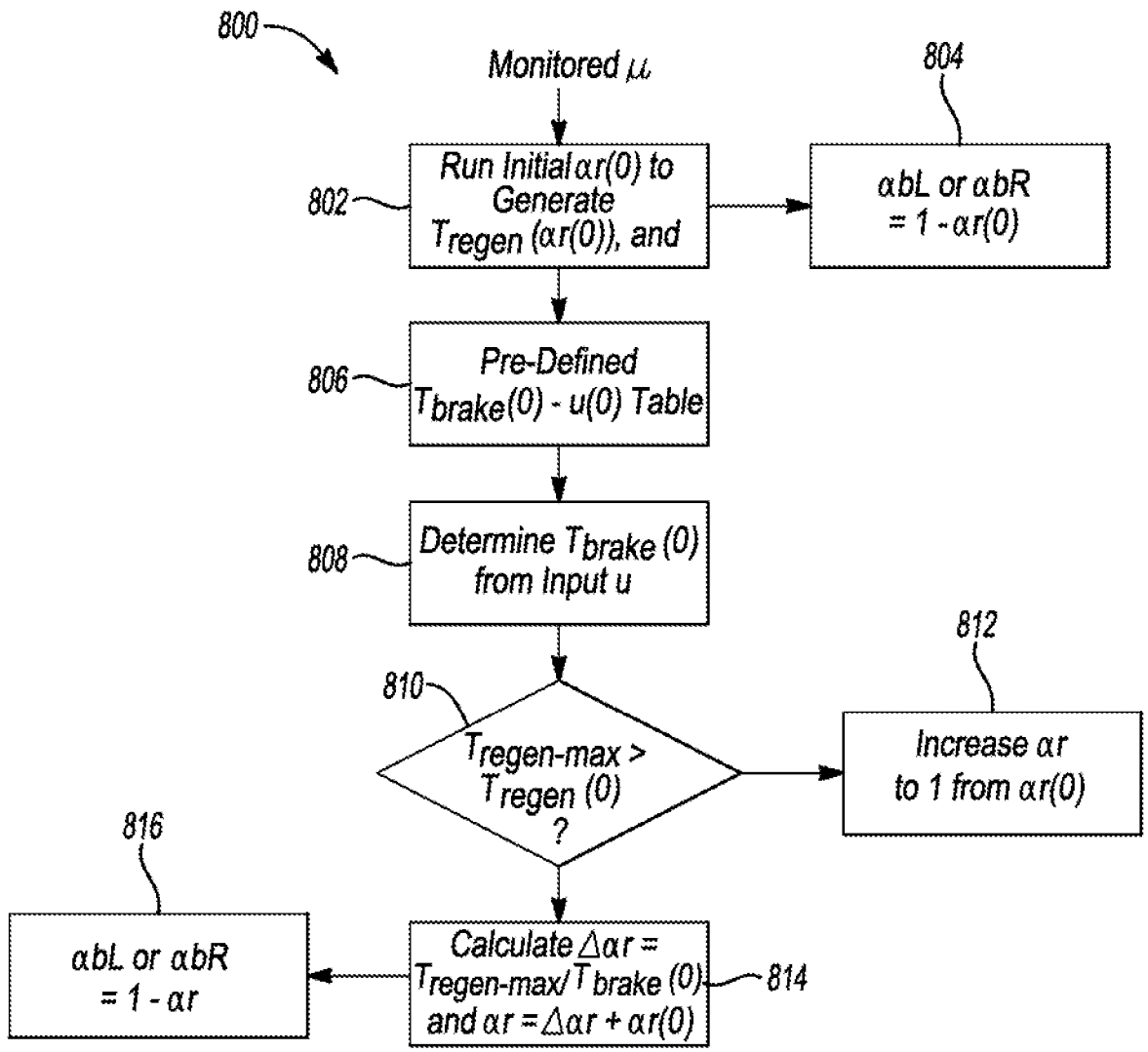
FIG. 16 is a flowchart illustrating a second method of calculating the friction braking and regenerative braking weighting coefficients.

The second method (hereinafter referrer to method 2), which is represented by the flowchart 800 in FIG. 16, includes determining the weighting coefficient $\alpha_r$ according to a characteristic of a typical ABS control that docs not include controlling regenerative braking (e.g., according to the closed loop control in FIG. 9 without a regenerative braking input). The static relationship of friction braking torque $T_{brake}(0)$ and its control variable $u(0)$ can be characterized in the original ABS control system (i.e., the typical ABS control that docs not include controlling regenerative braking). According to the static characteristic of $T_{brake}(0)$ vs. $u(0)$, the static braking torque value $T_{brake}(0)$ can be determined from value $u(0)$. The basic idea of method 2 is to the apply ABS control without regenerative braking (e.g., according to the closed loop control in FIG. 9 without a regenerative braking input) for a few sampling steps ahead of an RBS-ABS event control in order to determine how much friction braking torque can be replaced by regenerative braking torque.

An initial value of $\alpha_r$ is set to be zero or $\alpha_r(0)$ at block 802. The initial value of either $\alpha_{bL}$ or $\alpha_{bR}$ will be equal to $1-\alpha_r$ as illustrated in block 804. The initial $\alpha_r(0)$ can be set based on in the lowest coefficient of friction between the tire and the road surface $\mu$ such that a very small amount regenerative braking torque is generated. It means that the most of braking torque is generated by the friction ABS control channel. The initial value of the control variable $u(0)$, which may be representative of a signal that is indicative of a total torque demand, that correlates with the initial value of the weighting coefficient $\alpha_r(0)$ is monitored at block 802. The monitored value control the variable u compared to a pre-defined $T_{brake}(0)$ vs. $u(0)$ table at block 806 so that a friction braking only torque $T_{brake}(0)$, that would satisfy the entire braking torque demand is determined at block 808. Next, how much brake torque can be replaced by regenerative braking torque by increasing the weighting coefficient $\alpha_r$ value is calculated. At decision block 810, if the maximum regenerative braking torque $T_{regen-max}>$a total barking torque demand (which correlates with $T_{brake}(0)$), $\alpha_r$ is increased to 1 from $\alpha_r(0)$ at block 812. The maximum regenerative braking torque $T_{regen-max}$ of the electric machine or motor (e.g., M/G 18) may be obtained from its torque-speed characteristic curve of the particular electric machine or motor. At decision block 810, if the maximum regenerative braking torque $T_{regen-max}<$the total barking torque demand (which correlates with $T_{brake}(0)$), $\alpha_r$ is increased to $\alpha_r=\Delta\alpha_r+\alpha_r(0)$ at block 814, where $\Delta\alpha_r=T_{regen-max}/T_{brake}(0)$). The adjusted value of either $\alpha_{bL}$ or $\alpha_{bR}$, after $\alpha_r$ has been adjusted at block 814, will be equal to $1-\alpha_r$ as illustrated in block 816, relative to the value of $\alpha_r$ alter being at block 814. The relationship of braking torque $T_{brake}(0)$ vs $u(0)$ at block 806 may be expressed a lookup table or an algorithm of fuzzy logic based on the ABS-only test data.

Figure 17:
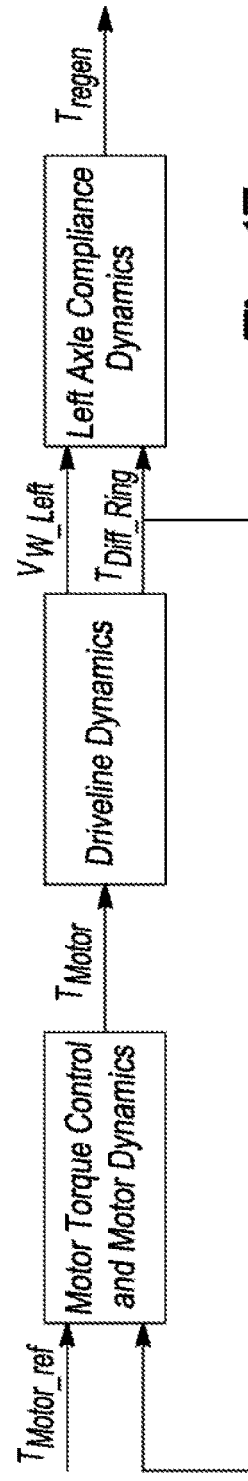
FIG. 17 is a block diagram of a driveline in a vehicle.

Design of the pre-compensator $C_{pc}(s)$ may be based on model identification and system modeling. The pre-compensator $C_{pc}(s)$ as expressed in equations (9) and (15) plays an important role in the of RBS-ABS event control. The purpose of the design of the pre-compensator $C_{pc}(s)$ is to identify the model of driveline M(s)T(s) and friction brake actuation system H(s). The different modeling methods based on physical system concepts and or test data may be applied. For example, a nonlinear autoregressive with exogenous terms (ARX) model may be used in the model identification process. The nonlinear ARX model may be represented by equation (19):

$$y(t)=F(y(t-1),y(t-2),\ldots,y(t-na),u(t),u(t-1),\ldots,u(t-nb-1l)) \quad (19)$$

where F represents the nonlinear function, and the variable or items within the parenthesis represents the regressors that are delayed input and output variables of a linear single input, single output (SISO) ARX model. The input of driveline dynamic system shown in FIG. 17 is a desire torque or torque reference $T_{motor\_ref}$ of a motor torque control system (i.e., a torque control system for M/G 18). The output is a regenerative braking torque $T_{regen}$ on the axle which can be measured by the installing strain gage sensor. After capturing the input and output data, we can use above-mentioned system identification method to obtain the driveline model.

It is noted that the reversed transfer function of M(s)T(s) is needed to design the pre-compensator represented by equation (9). To reduce the non-proper function effect, first order filters with high frequency bandwidth are used in the reversed function of M(s)T(s) to obtain approximate reversed dynamics of M(s)T(s) in the effective bandwidth.

The hydraulic actuator model of friction brake system is generally modeled as a first order system with time delay. It is reasonable because the pressure closed loop control is used in the hydraulic actuators. Even though the actuator dynamics is highly nonlinear, in particular, in the higher pressure, the closed loop control can improve its nonlinear dynamics and the resulting pressure, and ultimately torque, response is approximate linear first order system, that is, $$H(s) = \frac{K}{as+1} e^{-\tau},$$

where constant parameters K, a and τ are determined by the testing.

The optimization of RBS-ABS event control system (e.g., 500 or 500') relies on not only pre-compensator design, but also the ABS control performance. Any optimal and robust control design methods may be applied because the proposed RBS-ABS event control has a general feedback control architecture.

The proposed RBS-ABS event controller may be utilized to control friction and regenerative braking torque in response to and during an anti-lock braking event for the vehicles with different types of driveline configurations, other than driveline configurations having an open differential and a single electric machine. When it is used in vehicles with in-wheel motors (individual hub motors), the pre-compensator $C_{pc}(s)$ in (5) becomes $C_{pc}(s)=1$ because the driveline dynamics M(s)T(s) and friction brake hydraulic dynamics H(s) do not exist (when transfer function M(s)T(s)=1 and H(s)=1). This is a simple case for the regen braking control during ABS event. When it is used in the driveline with single motor directly mounted in front wheel or and rear wheel axles, the driveline dynamics M(s)T(s) is extremely simplified. The pre-compensator $C_{pc}(s)$ is related with this simplified driveline dynamics and friction brake hydraulic actuator dynamics H(s).

Simulated testing results of the RBS-ABS event control system (e.g., 500 or 500') are illustrated in FIGS. 18-20. Three simulation tests were conducted. The first simulation test illustrates ABS control only without regenerative braking torque input. The second simulation test illustrates non-zero regenerative braking torque effect for ABS Control where an open loop based regenerative braking torque is added to ABS. The third simulation test illustrates an RBS-ABS event control where regenerative braking and friction braking are controlled (e.g., 500 or 500'). The test results illustrate that RBS-ABS event control is an effective solution of integrating regen braking torque and friction braking torque during ABS event to satisfy desired wheel slip with same level of stop distance in comparison with that of ABS control only.

FIGS. 18A-18H illustrates the simulation test curves of the ABS event without regenerative braking torque input. The test curves of two rear wheels are shown since the electric motor delivers regenerative braking torque to the rear wheels by an open differential in the vehicle. The test curves of left and right wheels include: torque acted on axles (which is referred as regenerative braking torques) [Nm], friction braking torques [Nm], vehicle speed and wheel speeds [mps], and wheel slip ratios. The left wheel/tire is a on road surface where the coefficient of friction between the tire and the road surface μ is low and the static value in the slip-friction curve (i.e., the slip ratio λ) is 0.2. The right wheel/tire is on road surface where the coefficient of friction between the tire and the road surface μ is high, and the static value in its slip-friction curve (i.e., the slip ratio λ) is 0.8.

As shown in FIGS. 18A-18H, the initial vehicle speed value is 30 [mps]. During braking, ABS control maintains the wheel slip ratio at the reference value −0.2. It is noticed that the regenerative braking torque displays a different initial dynamic response from that of the friction braking torque. This is because of an initial vehicle speed 30 [mps] is setup in the vehicle model, the other initial values of controlled plant model and controller do not match with this initial value. It is also noticed that the steady-stale value of the regenerative braking torque is a positive value which is affected by compliance between tires and driveline. Strictly speaking, the results in FIGS. 18A-18H do not represent regenerative braking torque but rather a reaction torque on axles when the regenerative braking torque command is zero (this is why it is referred as the torque on the axle above).

FIGS. 19A-19H illustrate the simulation test curves of the open loop based non-zero regenerative bake torque effect for ABS control. When the ABS is activated, an open loop regenerative braking torque is added to ABS control system (e.g., the system of FIG. 9) to simulate the control strategy 3 with non-zero regen braking torque. The regenerative braking torque may increase the wheel slip during the ABS operation. FIGS. 19A-19H illustrate the simulation results. At t=2, a regenerative braking toque $T_{regen}$=350 (Nm) is added. As a result, a wheel slipping occurred on the left wheel which is on road surface where the coefficient of friction between the tire and the road surface g is low. This verifies that regenerative braking torques effect as a disturbance when controlled via an open loop (e.g., when controlled according to system of FIG. 9).

FIGS. 20A-20H illustrates the simulation results under the same test conditions as illustrated in FIGS. 19A-19H. When the ABS is activated at t=0, a RBS-ABS control is applied (e.g., 500 or 500'). The regenerative braking torque and friction braking torque are integrated during vehicle braking operation, and wheel slip ratios are maintained at the required value =0.2. The vehicle stability is maintained and stop distance is in the same level comparing with FIGS. 18A-18H.

All of the methods, flowcharts, block diagrams, graphs, etc. described herein and depicted in any of the FIGS. 2 and 6-18 may be stored as control logic and/or an algorithms within the controller 50. The controller 50 may implement the methods, flowcharts, block diagrams, graphs, etc. described herein by controlling the various components of the vehicle 10.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
an electric machine configured to recharge a battery during regenerative braking;
friction brakes configured to apply torque to wheels of the vehicle to slow the vehicle;
a drivetrain having a transmission; and
a controller programmed to, in response to and during an anti-locking braking event,
generate a signal indicative of a total torque demand to brake the vehicle based on a difference between a desired wheel slip ratio and an actual wheel slip ratio,
adjust a regenerative braking torque of the electric machine based on a product of the signal and a regenerative braking weighting coefficient to maintain or drive actual wheel slip at or toward the desired wheel slip, and
adjust a friction braking torque of the friction brakes based on a product of the signal and a friction braking weighting coefficient to maintain or drive actual wheel slip at or toward the desired wheel slip.

2. The vehicle of claim 1, wherein the regenerative braking torque is further adjusted by a pre-compensator.

3. The vehicle of claim 2, wherein the pre-compensator is based on transfer functions that represents dynamics of the electric machine, dynamics of the friction brakes, and dynamics of the drivetrain.

4. The vehicle of claim 1, wherein the friction braking torque is further adjusted by a pre-compensator.

5. The vehicle of claim 4, wherein the pre-compensator is based on transfer functions that represents dynamics of the electric machine, dynamics of the friction brakes, and dynamics of the drivetrain.

6. The vehicle of claim 1, wherein the regenerative braking weighting coefficient is based on a ratio between a maximum braking torque of the electric machine and the total torque demand.

7. The vehicle of claim 1, wherein a sum of the regenerative braking weighting coefficient and the friction braking weighting coefficient is one.

8. The vehicle of claim 1, wherein the regenerative braking weighting coefficient is based on a ratio between a maximum braking torque of the electric machine and a braking torque threshold that corresponds with the wheels becoming locked.

9. The vehicle of claim 8 wherein a sum of the regenerative braking weighting coefficient and the friction braking weighting coefficient is one.

10. The vehicle of claim 1, wherein the regenerative braking torque is further adjusted based on transfers functions that represent dynamics of the electric machine and dynamics of the drivetrain.

11. The vehicle of claim 1, wherein the friction braking torque is further adjusted based on a transfer function that represents dynamics of an actuation system of the friction brakes.

12. A vehicle comprising:
an electric machine configured to recharge a battery during regenerative braking;
a drivetrain configured to transfer torque between the electric machine and a first wheel and to transfer torque between the electric machine and a second wheel;
a first friction brake configured to apply torque to the first wheel to slow the vehicle;
a second friction brake configured to apply torque to the second wheel to slow the vehicle; and
a controller programmed to, in response to and during an anti-locking braking event,
generate a signal indicative of a total torque demand to brake the vehicle based on a difference between a desired wheel slip ratio and an actual wheel slip ratio,
adjust a regenerative braking torque of the electric machine based on a product of the signal and a first weighting coefficient to maintain or drive actual wheel slip at or toward the desired wheel slip,
adjust a first friction braking torque of the first friction brake based on a product of the signal and a second weighting coefficient to maintain or drive actual wheel slip at or toward the desired wheel slip, and
adjust a second friction braking torque of the second friction brake based on a product of the signal and a third weighting coefficient to maintain or drive actual wheel slip at or toward the desired wheel slip.

13. The vehicle of claim 12, wherein a sum of the first weighting coefficient and the second weighting coefficient is one.

14. A vehicle comprising:
an axle having an input shaft to an open differential and output shaft extending out of the open differential;
wheels secured to each output shaft;
an electric machine secured to the input shaft and configured to slow the vehicle during regenerative braking;
friction brakes disposed about the wheels and configured to slow the vehicle; and
a controller programmed to, in response to and during an anti-locking braking event,
generate a signal indicative of a total torque demand to brake the vehicle based on a difference between a desired wheel slip ratio and an actual wheel slip ratio,
determine a regenerative braking weighting coefficient based on a ratio between a maximum braking torque of the electric machine and a braking torque threshold that corresponds with the wheels of the axle becoming locked,
determine a friction braking weighting coefficient based on the regenerative braking weighting coefficient,
adjust a regenerative braking torque of the electric machine based on a product of the signal and a first weighting coefficient during the anti-lock braking event to maintain or drive actual wheel slip at or toward the desired wheel slip, and
adjust a friction braking torque of the friction brakes based on a product of the signal and a second weighting coefficient during the anti-lock weighting event to maintain or drive actual wheel slip at or toward the desired wheel slip.

15. The vehicle of claim 14, wherein the regenerative braking torque is further adjusted by a pre-compensator.

16. The vehicle of claim 15, wherein the pre-compensator is based on transfer functions that represent dynamics of the electric machine, dynamics of the friction brakes, and dynamics of a drivetrain and a transmission of the vehicle.

17. The vehicle of claim 14, wherein the friction braking torque is further adjusted by a pre-compensator.

18. The vehicle of claim 17, wherein the pre-compensator is based on transfer functions that represents dynamics of the electric machine, dynamics of the friction brakes, and dynamics of a drivetrain and a transmission of the vehicle.

19. The vehicle of claim 14, wherein a sum of the regenerative braking weighting coefficient and the friction braking weighting coefficient is one.

20. The vehicle of claim 14, wherein the regenerative braking torque is further adjusted based on a first transfer function that represents dynamics of the electric machine and is further adjusted based on a second transfer function that represents dynamics of a drivetrain and a transmission of the vehicle, and wherein the friction braking torque is further adjusted based on a third transfer function that represents dynamics of an actuation system of the friction brakes.

* * * * *